United States Patent
Abedini et al.

(10) Patent No.: US 11,800,388 B2
(45) Date of Patent: Oct. 24, 2023

(54) INTER DISTRIBUTED UNIT (INTER-DU) CROSSLINK INTERFERENCE (CLI) MEASUREMENT AND REPORTING

(71) Applicant: QUALCOMM Incorporated, San Diego, CA (US)

(72) Inventors: Navid Abedini, Basking Ridge, NJ (US); Xipeng Zhu, San Diego, CA (US); Qian Zhang, Basking Ridge, NJ (US); Karl Georg Hampel, Hoboken, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

(*) Notice: Subject to any disclaimer, the term of this patent is extended or adjusted under 35 U.S.C. 154(b) by 231 days.

(21) Appl. No.: 17/447,658

(22) Filed: Sep. 14, 2021

(65) Prior Publication Data

US 2022/0085901 A1 Mar. 17, 2022

Related U.S. Application Data

(60) Provisional application No. 63/078,694, filed on Sep. 15, 2020.

(51) Int. Cl.
*H04B 17/345* (2015.01)
*H04B 17/40* (2015.01)
(Continued)

(52) U.S. Cl.
CPC .......... *H04W 24/08* (2013.01); *H04B 17/345* (2015.01); *H04B 17/40* (2015.01); *H04W 8/24* (2013.01); *H04W 24/10* (2013.01); *H04W 56/0015* (2013.01); *H04W 56/0025* (2013.01); *H04W 72/046* (2013.01); *H04W 72/0453* (2013.01); *H04W 84/02* (2013.01);
(Continued)

(58) Field of Classification Search
CPC ..... H04B 7/02–17; H04B 17/0082–409; H04J 11/0023–0093; H04J 2011/0003–0096; H04W 8/22–245; H04W 24/02–10; H04W 28/02–26; H04W 36/0005–385; H04W 40/005–38; H04W 48/02; H04W 48/20; H04W 52/18–288; H04W 56/0005–0095; H04W 72/02–569; H04W 74/002–0891; H04W 84/005–22; H04W 88/005–188; H04W 92/02–24
See application file for complete search history.

(56) References Cited

U.S. PATENT DOCUMENTS

2021/0219155 A1* 7/2021 Ye .................. H04W 24/08
2022/0279532 A1* 9/2022 Barac ............... H04W 24/08

FOREIGN PATENT DOCUMENTS

WO WO-2022031144 A1 * 2/2022 ............ H04W 24/08

* cited by examiner

*Primary Examiner* — Timothy J Weidner
(74) *Attorney, Agent, or Firm* — Harrity & Harrity, LLP

(57) ABSTRACT

Various aspects of the present disclosure generally relate to wireless communication. In some aspects, a distributed unit (DU) of a first integrated access and backhaul (IAB) node may configure an indication of a capability to reuse measurements, associated with a mobile terminal of the first IAB node, as crosslink interference measurements for a DU of a second IAB node. The DU may transmit the indication to a central unit of an IAB donor. Numerous other aspects are provided.

30 Claims, 17 Drawing Sheets

(51) Int. Cl.
*H04W 8/24* (2009.01)
*H04W 24/08* (2009.01)
*H04W 24/10* (2009.01)
*H04W 56/00* (2009.01)
*H04W 72/04* (2023.01)
*H04W 84/02* (2009.01)
*H04W 88/02* (2009.01)
*H04W 88/08* (2009.01)
*H04W 88/12* (2009.01)
*H04W 92/02* (2009.01)
*H04W 92/10* (2009.01)
*H04W 92/12* (2009.01)
*H04W 92/20* (2009.01)
*H04W 92/22* (2009.01)
*H04W 72/0453* (2023.01)
*H04W 72/044* (2023.01)

(52) U.S. Cl.
CPC .......... *H04W 88/02* (2013.01); *H04W 88/085* (2013.01); *H04W 88/12* (2013.01); *H04W 92/02* (2013.01); *H04W 92/10* (2013.01); *H04W 92/12* (2013.01); *H04W 92/20* (2013.01); *H04W 92/22* (2013.01)

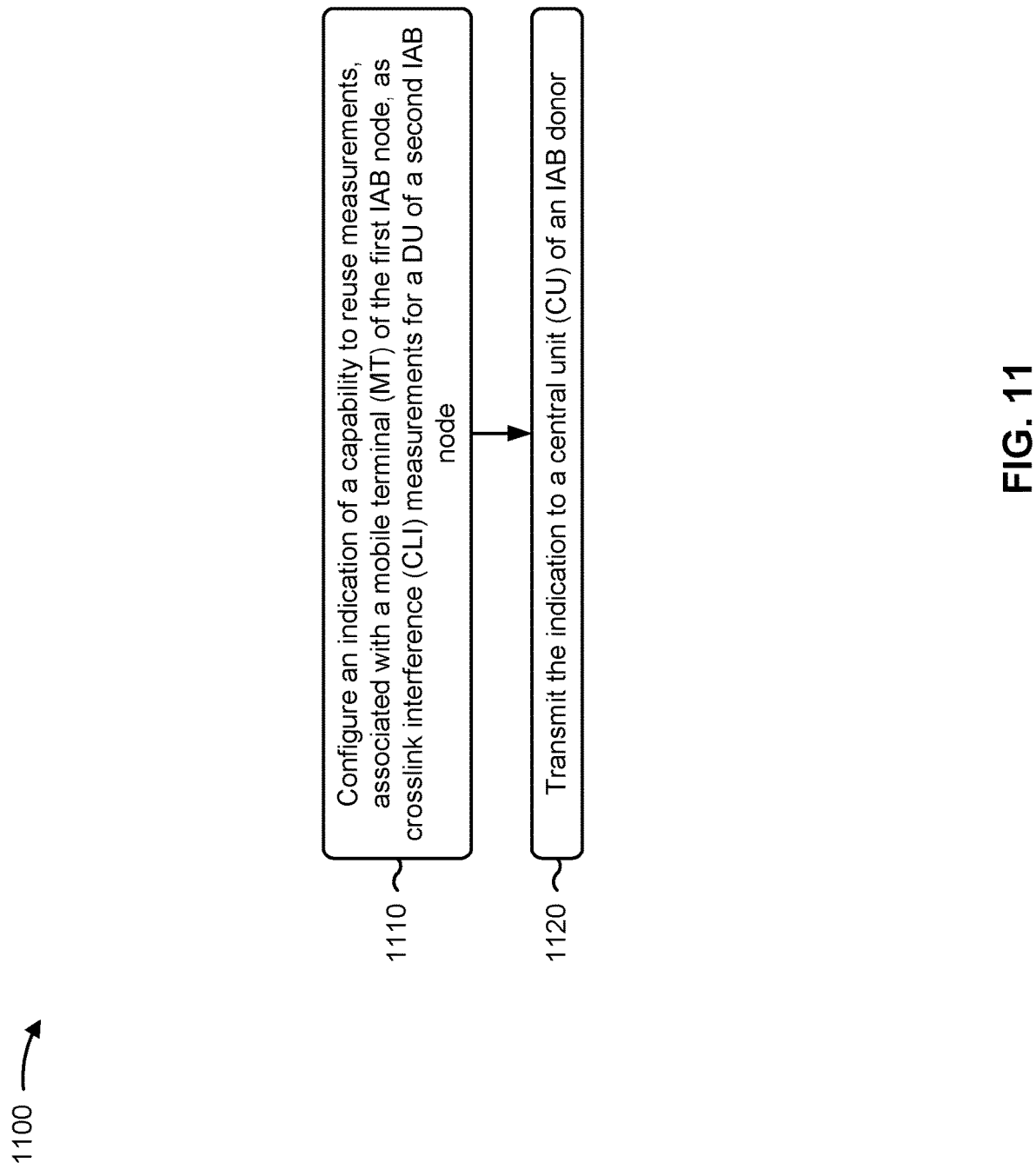

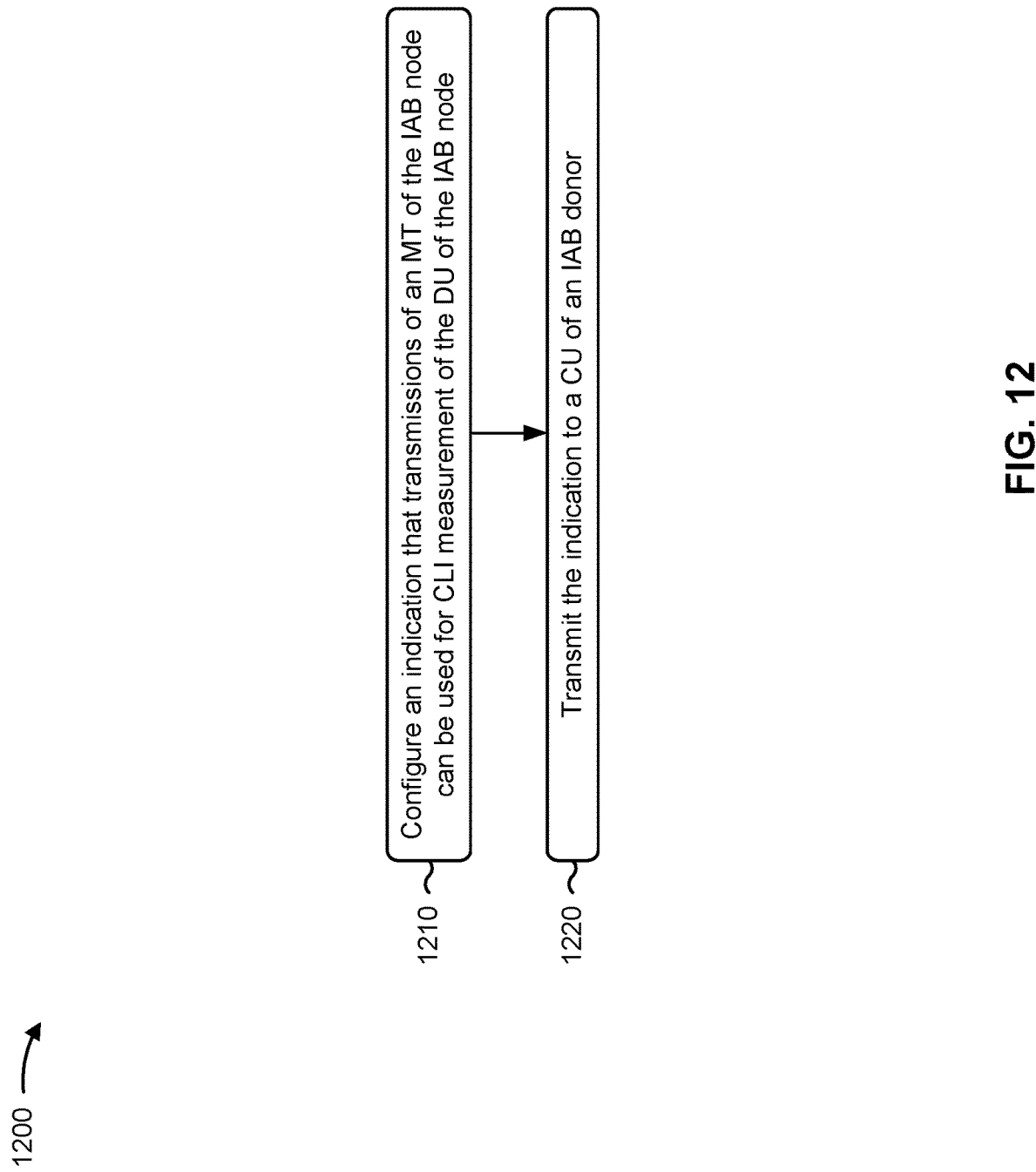

US 11,800,388 B2

INTER DISTRIBUTED UNIT (INTER-DU) CROSSLINK INTERFERENCE (CLI) MEASUREMENT AND REPORTING

CROSS-REFERENCE TO RELATED APPLICATION

This patent application claims priority to U.S. Provisional Patent Application No. 63/078,694, filed on Sep. 15, 2020, entitled "INTER DISTRIBUTED UNIT (INTER-DU) CROSSLINK INTERFERENCE (CLI) MEASUREMENT AND REPORTING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for inter-distributed unit (inter-DU) crosslink interference (CLI) measurement and reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a distributed unit (DU) of a first integrated access and backhaul (IAB) node includes configuring an indication of a capability to reuse measurements, associated with a mobile terminal (MT) of the first IAB node, as crosslink interference (CLI) measurements for a DU of a second IAB node; and transmitting the indication to a central unit (CU) of an IAB donor.

In some aspects, a method of wireless communication performed by a DU of an IAB node includes configuring an indication that transmissions of an MT of the IAB node can be used for CLI measurement of the DU of the IAB node; and transmitting the indication to a CU of an IAB donor.

In some aspects, a method of wireless communication performed by a CU of an IAB donor includes receiving, from a DU of a first IAB node, an indication that at least one of transmissions or measurements of an MT of the first IAB node can be used for CLI measurement of a DU of a second IAB node; and configuring at least one of the DU of the first IAB node or another node to perform one or more CLI measurements based at least in part on the indication.

In some aspects, a DU of a first IAB node for wireless communication includes a memory and one or more processors coupled to the memory, the memory and the one or more processors configured to configure an indication of a capability to reuse measurements, associated with an MT of the first IAB node, as CLI measurements for a DU of a second IAB node; and transmit the indication to a CU of an IAB donor.

In some aspects, a DU of an IAB node for wireless communication includes a memory and one or more processors coupled to the memory, the memory and the one or more processors configured to configure an indication that transmissions of an MT of the IAB node can be used for CLI measurement of the DU of the IAB node; and transmit the indication to a CU of an IAB donor.

In some aspects, a CU of an IAB donor for wireless communication includes a memory and one or more processors coupled to the memory, the memory and the one or more processors configured to receive, from a DU of a first IAB node, an indication that at least one of transmissions or measurements of an MT of the first IAB node can be used for CLI measurement of a DU of a second IAB node; and configure at least one of the DU of the first IAB node or another node to perform one or more CLI measurements based at least in part on the indication.

In some aspects, a non-transitory computer-readable medium storing a set of instructions for wireless communication includes one or more instructions that, when executed by one or more processors of a DU of a first IAB node, cause the DU of the first IAB node to configure an indication of a capability to reuse measurements, associated with an MT of the first IAB node, as CLI measurements for a DU of a second IAB node; and transmit the indication to a CU of an IAB donor.

In some aspects, a non-transitory computer-readable medium storing a set of instructions for wireless communication includes one or more instructions that, when executed by one or more processors of a DU of an IAB node, cause the DU of the IAB node to configure an indication that transmissions of an MT of the IAB node can be used for CLI measurement of the DU of the IAB node; and transmit the indication to a CU of an IAB donor.

In some aspects, a non-transitory computer-readable medium storing a set of instructions for wireless communication includes one or more instructions that, when executed by one or more processors of a CU of an IAB donor, cause the CU of the IAB donor to receive, from a DU of a first IAB node, an indication that at least one of transmissions or measurements of an MT of the first IAB node can be used for CLI measurement of a DU of a second IAB node; and configure at least one of the DU of the first IAB node or another node to perform one or more CLI measurements based at least in part on the indication.

In some aspects, an apparatus for wireless communication includes means for configuring an indication of a capability to reuse measurements, associated with an MT of a first IAB node, as CLI measurements for a DU of a second IAB node; and means for transmitting the indication to a CU of an IAB donor.

In some aspects, an apparatus for wireless communication includes means for configuring an indication that transmissions of an MT of an IAB node can be used for CLI measurement of the DU of the IAB node; and means for transmitting the indication to a CU of an IAB donor.

In some aspects, an apparatus for wireless communication includes means for receiving, from a DU of a first IAB node, an indication that at least one of transmissions or measurements of an MT of the first IAB node can be used for CLI measurement of a DU of a second IAB node; and means for configuring at least one of the DU of the first IAB node or another node to perform one or more CLI measurements based at least in part on the indication.

Aspects generally include a method, apparatus, system, computer program product, non-transitory computer-readable medium, user equipment, base station, node, central unit, distributed unit, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 11-13 are diagrams illustrating example processes associated with inter-DU CLI measurement and reporting, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
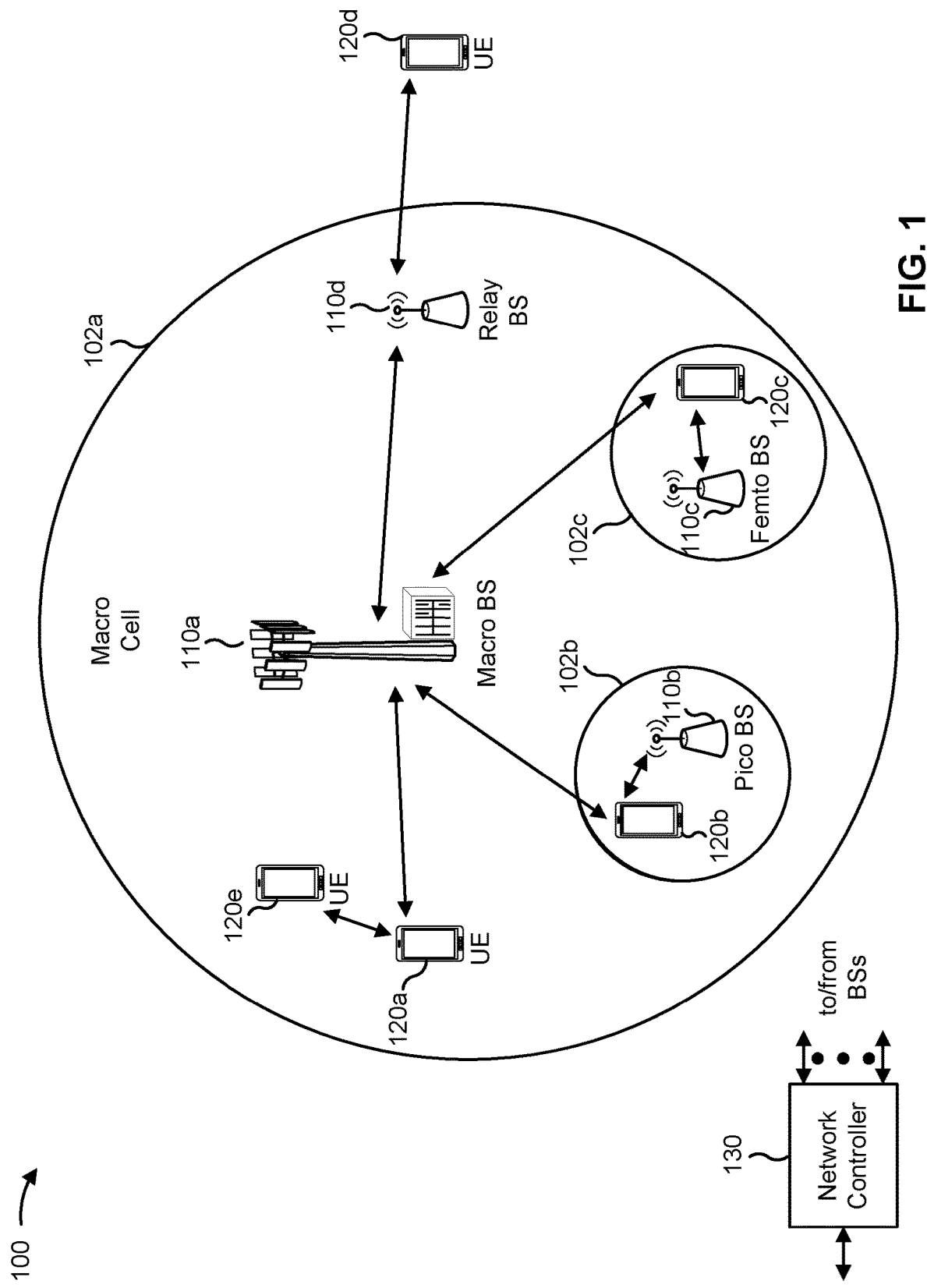
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
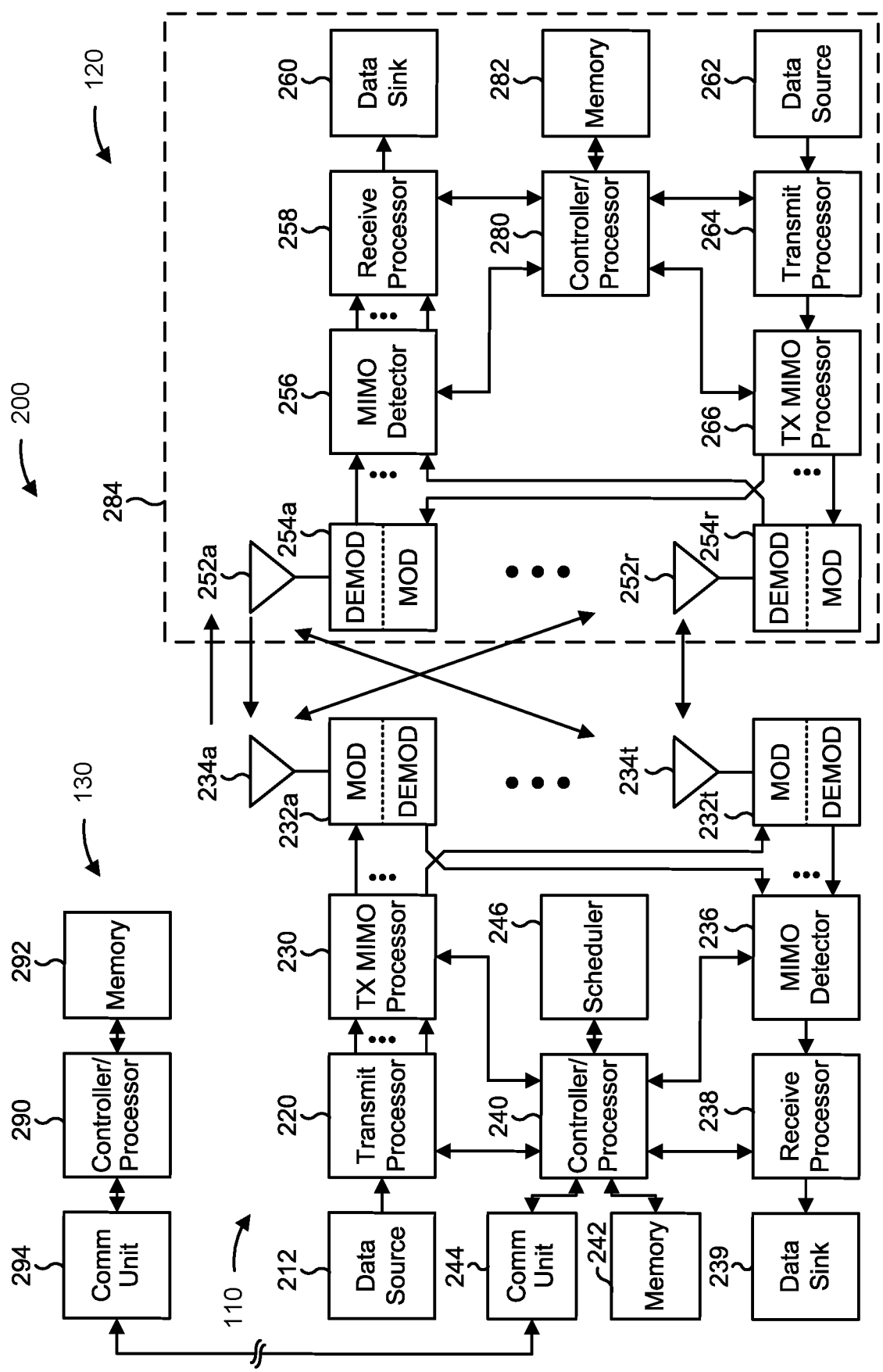
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 8-13).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 8-13).

Controller/processor 240 of base station 110, controller/processor 280 of UE 120, and/or any other component(s) of FIG. 2 may perform one or more techniques associated with inter distributed unit (inter-DU) crosslink interference (CLI) measurement and reporting, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, a base station 110 includes means for configuring an indication of a capability to reuse measurements, associated with a mobile terminal (MT) of a first integrated access and backhaul (IAB) node, as CLI measurements for a DU of a second IAB node; and/or means for transmitting the indication to a central unit (CU) of an IAB donor. The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station 110 includes means for configuring an indication that the base station 110 and the MT of the first IAB node share a same radio frequency (RF) architecture, where the indication that the base station 110 and the MT of the first IAB node share the same RF architecture implicitly indicates the capability to reuse measurements, associated with the MT of the first IAB node, as CLI measurements for the DU of the second IAB node.

In some aspects, the base station 110 includes means for configuring a 1-bit indicator to explicitly indicate the capability. In some aspects, the base station 110 includes means for configuring an indication of one or more cell identifiers associated with the base station 110 for which measurements associated with the MT of the first IAB node can be reused as CLI measurements for the DU of the second IAB node. In some aspects, the base station 110 includes means for configuring an indication of at least one of one or more beam directions supported by the MT of the first IAB node or one or more frequency bands supported by the MT of the first IAB node. In some aspects, the base station 110 includes means for configuring an indication of one or more SSB indices, associated with one or more cell identifiers, that correspond to one or more beam directions that can be supported by the MT of the first IAB node for measurements. In some aspects, the base station 110 includes means for configuring another indication of a capability to reuse measurements, of an MT of the second IAB node performed by the MT of the first IAB node, as CLI measurements for the DU of the second IAB node; and/or means for transmitting the other indication to the CU of the IAB donor.

In some aspects, a base station 110 includes means for configuring an indication that transmissions of an MT of a IAB node can be used for CLI measurement of the base station 110; and/or means for transmitting the indication to a CU of an IAB donor. The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station 110 includes means for configuring an indication that the base station 110 and the MT of the IAB node share a same RF architecture, where the indication that the base station 110 and the MT of the first IAB node share the same RF architecture implicitly indicates that transmissions of the MT of the IAB node can be used for CLI measurement of the base station 110. In some aspects, the base station 110 includes means for configuring a 1-bit indicator to explicitly indicate that transmissions of the MT of the IAB node can be used for CLI measurement of the base station 110.

In some aspects, the base station 110 includes means for configuring an indication of one or more cell identifiers associated with the DU of the IAB node for which transmissions of the MT of the IAB node can be used for CLI measurement of the DU of the IAB node. In some aspects, the base station 110 includes means for configuring an indication of at least one of one or more beam directions supported by the MT of the IAB node or one or more frequency bands supported by the MT of the IAB node.

In some aspects, a base station 110 includes means for receiving, from a DU of a first IAB node, an indication that at least one of transmissions or measurements of an MT of the first IAB node can be used for CLI measurement of a DU of a second IAB node; and/or means for configuring at least one of the DU of the first IAB node or another node to perform one or more CLI measurements based at least in part on the indication. The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station 110 includes means for configuring an MT of the second IAB node to transmit one or more uplink signals for CLI measurement based at least in part on the indication. In some aspects, the base station 110 includes means for coordinating, with a CU of an IAB donor, at least one of one or more uplink signals to be transmitted by an MT of the second IAB node for the one or more CLI measurements based at least in part on the indication, one or more measurement resources for one or more CLI measurements based at least in part on the indication, or results of the one or more CLI measurements.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
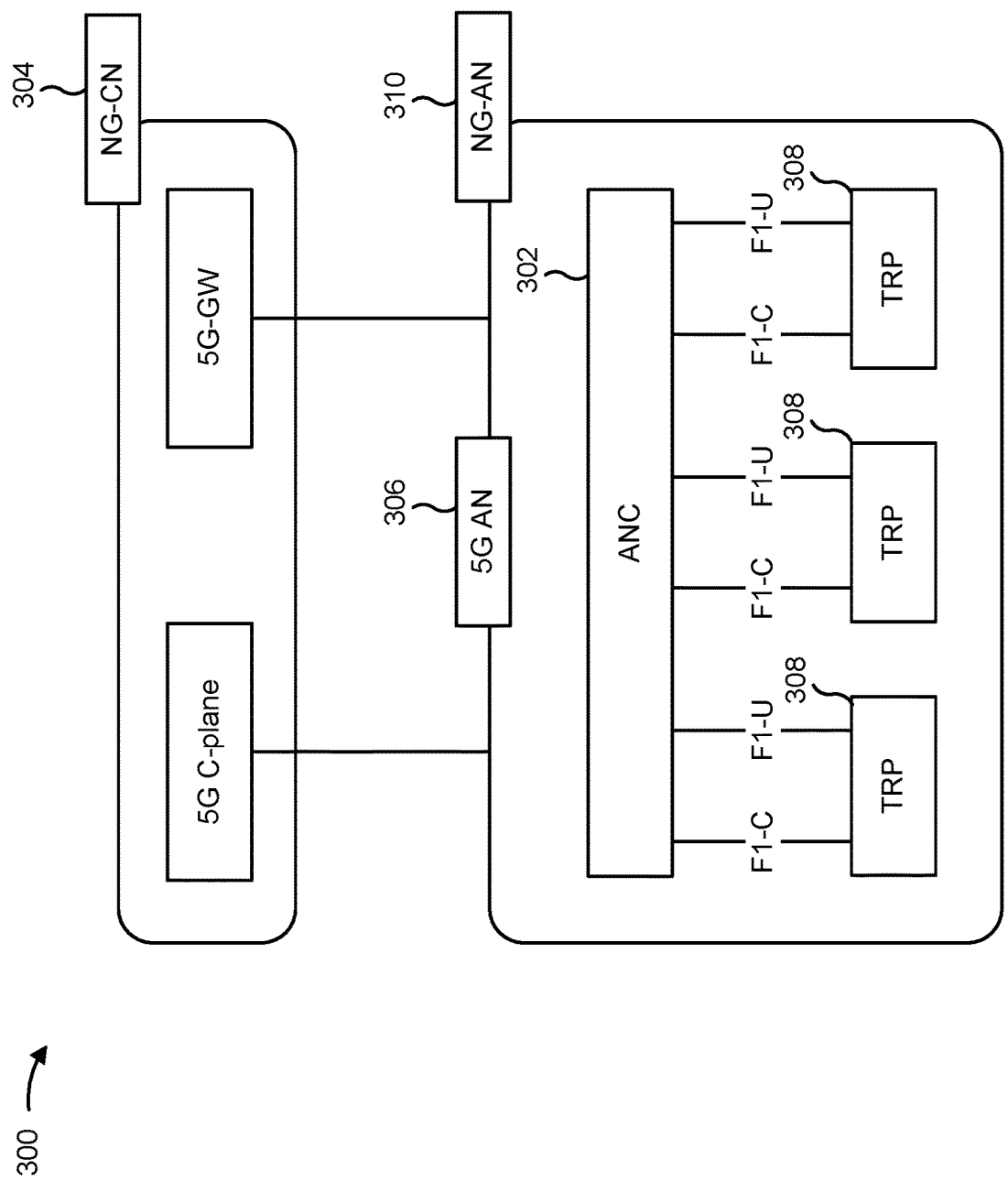
FIG. 3 illustrates an example logical architecture of a distributed radio access network (RAN), in accordance with the present disclosure.

FIG. 3 illustrates an example logical architecture of a distributed RAN 300, according to aspects of the present disclosure. A 5G access node 306 may include an access node controller (ANC) 302. The ANC may be a base station CU of the distributed RAN 300. The backhaul interface to the next generation core network (NG-CN) 304 may terminate at the ANC. The backhaul interface to neighboring next generation access nodes (NG-ANs) 310 may terminate at the ANC. The 5G access node 306 may also include one or more TRPs 308 (which may also be referred to as BSs, NR BSs, Node Bs, 5G NBs, APs, gNB, or some other term). As described above, "TRP" may be used interchangeably with "cell."

The TRPs 308 may be or may include a base station DU. The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 300 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the NG-AN 310 may support dual connectivity with NR. The NG-AN 310 may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of RAN 300. The packet data convergence protocol (PDCP), radio link control (RLC), or medium access control (MAC) protocol may be adaptably placed at the ANC or TRP.

According to various aspects, a base station may include a CU (e.g., ANC 302) and/or one or more DUs (e.g., one or more TRPs 308).

As indicated above, FIG. 3 is provided as an example. Other examples may differ from what is described with regard to FIG. 3.

Figure 4:
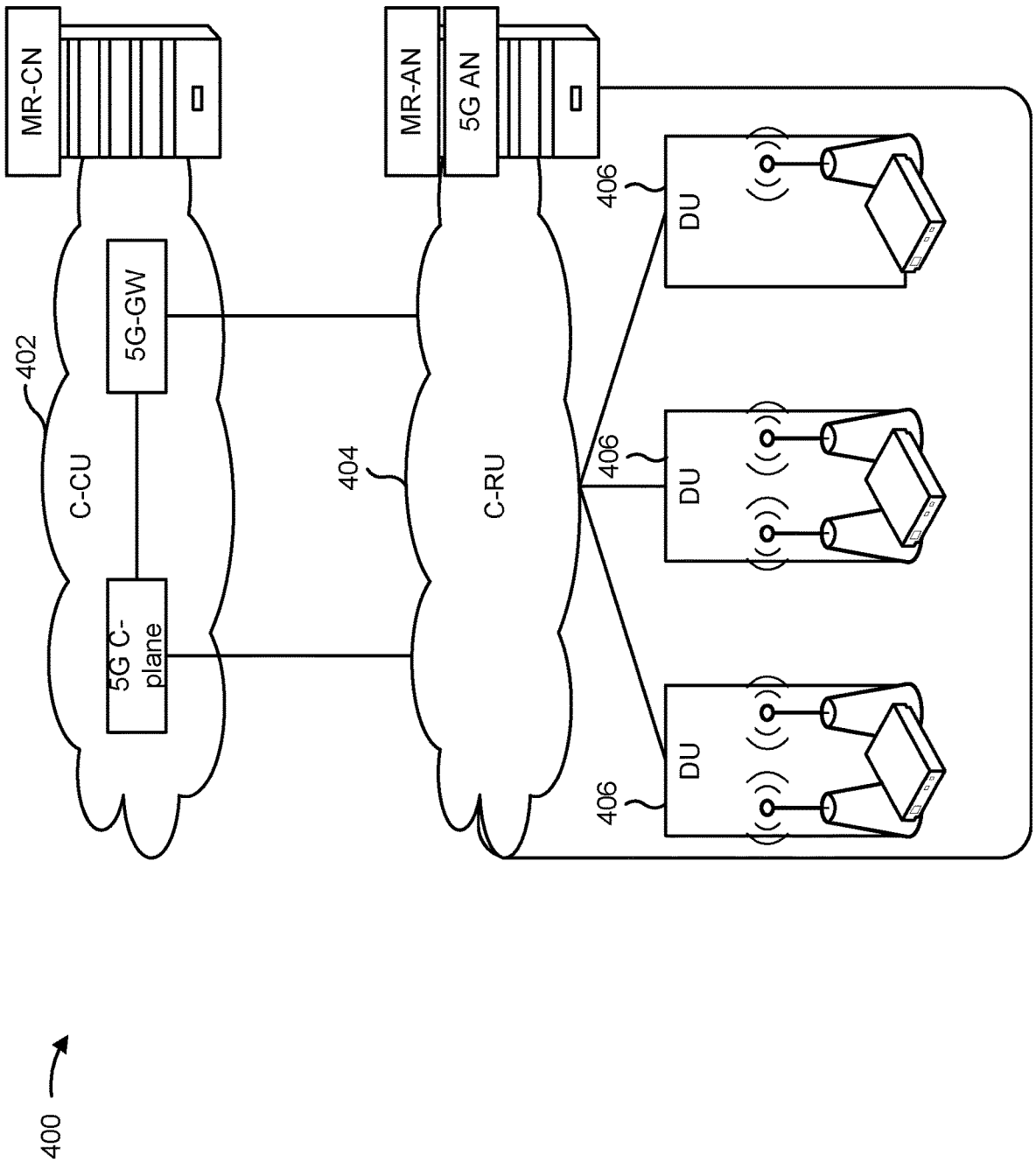
FIG. 4 illustrates an example physical architecture of a distributed RAN, in accordance with the present disclosure.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity.

A centralized RAN unit (C-RU) 404 (which may also be referred to as a base station CU) may host one or more ANC functions. Optionally, the C-RU may host core network functions locally. The C-RU may have distributed deployment. The C-RU may be closer to the network edge.

A base station DU 406 may host one or more TRPs. The base station DU 406 may be located at edges of the network with radio frequency (RF) functionality.

As indicated above, FIG. 4 is provided as an example. Other examples may differ from what is described with regard to FIG. 4.

Figure 5:
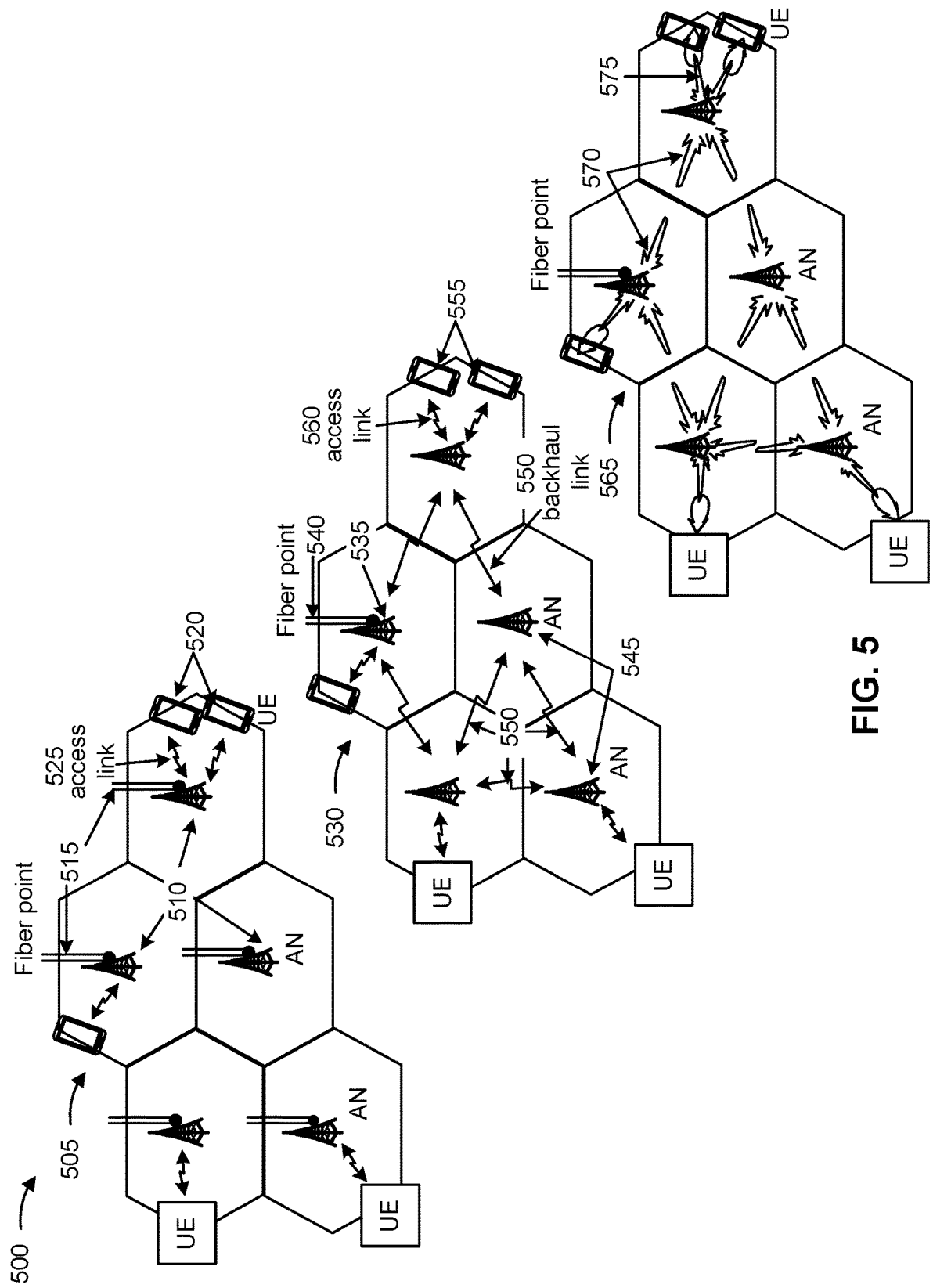
FIG. 5 is a diagram illustrating examples of RANs, in accordance with the disclosure.

FIG. 5 is a diagram illustrating examples 500 of radio access networks, in accordance with the disclosure.

As shown by reference number 505, a traditional (e.g., 3G, 4G, LTE, and/or the like) radio access network may include multiple base stations 510 (e.g., access nodes), where each base station 510 communicates with a core network via a wired backhaul link 515, such as a fiber connection. A base station 510 may communicate with a UE 520 via an access link 525, which may be a wireless link. In some aspects, a base station 510 shown in FIG. 5 may be a base station 110 shown in FIG. 1. In some aspects, a UE 520 shown in FIG. 5 may be a UE 120 shown in FIG. 1.

As shown by reference number 530, a radio access network may include a wireless backhaul network, sometimes referred to as an integrated access and backhaul (IAB) network. In an IAB network, at least one base station is an anchor base station 535 that communicates with a core network via a wired backhaul link 540, such as a fiber connection. An anchor base station 535 may also be referred to as an IAB donor (or IAB-donor). The IAB network may include one or more non-anchor base stations 545, sometimes referred to as relay base stations or IAB nodes (or IAB-nodes). The non-anchor base station 545 may communicate directly or indirectly with the anchor base station 535 via one or more backhaul links 550 (e.g., directly communicating with the anchor base station 535 or communicating via one or more non-anchor base stations 545) to form a backhaul path to the core network for carrying backhaul traffic. Backhaul link 550 may be a wireless link. Anchor base station(s) 535 and/or non-anchor base station(s) 545 may communicate with one or more UEs 555 via access links 560, which may be wireless links for carrying access traffic. In some aspects, an anchor base station 535 and/or a non-anchor base station 545 shown in FIG. 5 may be a base station 110 shown in FIG. 1. In some aspects, a UE 555 shown in FIG. 5 may be a UE 120 shown in FIG. 1.

As shown by reference number 565, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 570 between base stations may use millimeter wave signals to carry information and/or may be directed toward a target base station using beamforming and/or the like. Similarly, the wireless access links 575 between a UE and a base station may use millimeter wave signals and/or may be directed toward a target wireless node (e.g., a UE and/or a base station). In this way, inter-link interference may be reduced.

The configuration of base stations and UEs in FIG. 5 is shown as an example, and other examples are contemplated. For example, one or more base stations illustrated in FIG. 5 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 5 is provided as an example. Other examples may differ from what is described with regard to FIG. 5.

Figure 6:
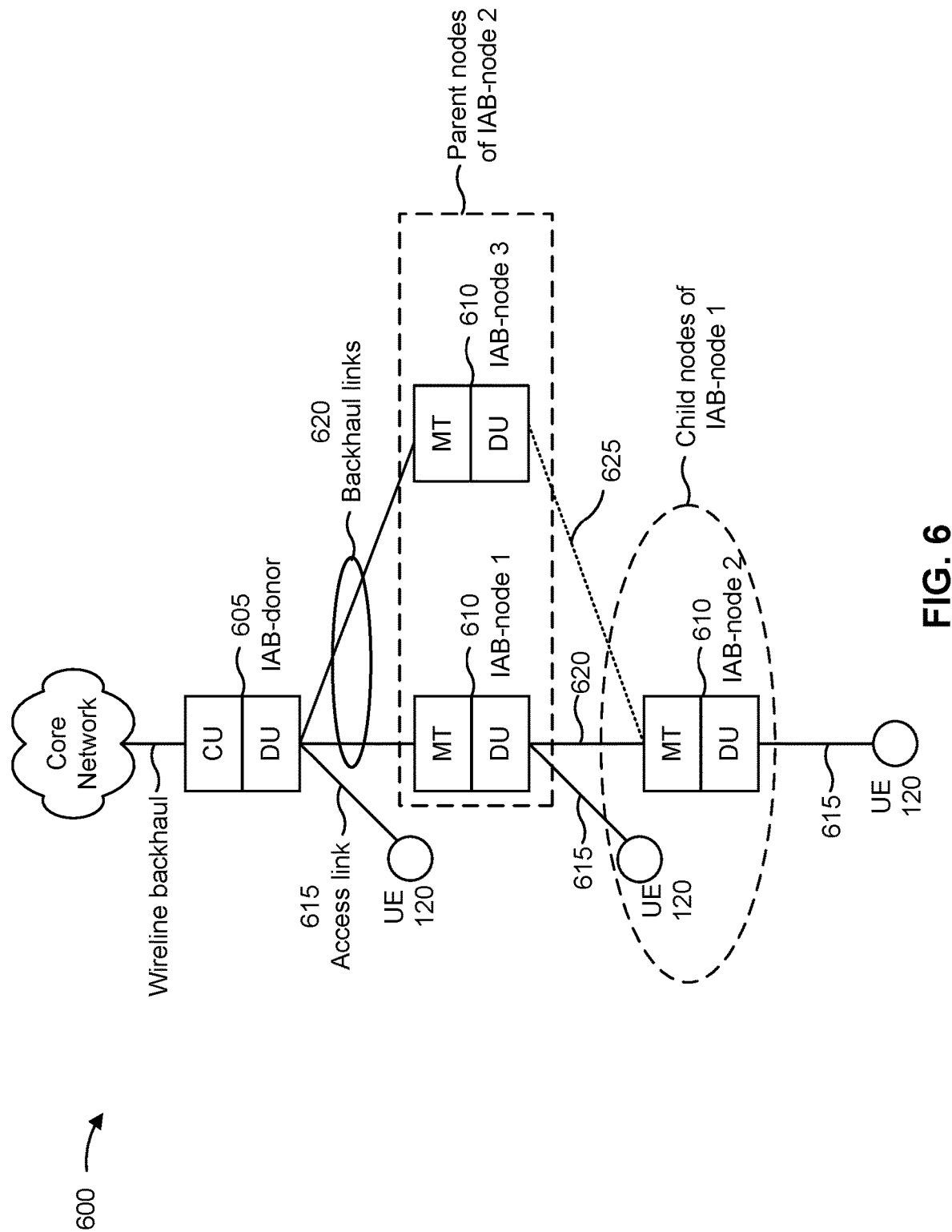
FIG. 6 is a diagram illustrating an example of an integrated access and backhaul (IAB) network architecture, in accordance with the disclosure.

FIG. 6 is a diagram illustrating an example 600 of an IAB network architecture, in accordance with the disclosure.

As shown in FIG. 6, an IAB network may include an IAB donor 605 (shown as IAB-donor) that connects to a core network via a wired connection (shown as a wireline backhaul). For example, an Ng interface of an IAB donor 605 may terminate at a core network. Additionally, or alternatively, an IAB donor 605 may connect to one or more devices of the core network that provide a core access and mobility management function (e.g., AMF). In some aspects, an IAB donor 605 may include a base station 110, such as an anchor base station, as described above in connection with FIG. 5. As shown, an IAB donor 605 may include a CU, which may perform ANC functions, AMF functions, and/or the like. The CU may configure a DU of the IAB donor 605 and/or may configure one or more IAB nodes 610 (e.g., an MT and/or a DU of an IAB node 610) that connect to the core network via the IAB donor 605. Thus, a CU of an IAB donor 605 may control and/or configure the entire IAB network that connects to the core network via the IAB donor 605, such as by using control messages and/or configuration messages (e.g., a radio resource control (RRC) configuration message, an F1 application protocol (F1AP) message, and/or the like).

As further shown in FIG. 6, the IAB network may include IAB nodes 610 (shown as IAB-node 1, IAB-node 2, and IAB-node 3) that connect to the core network via the IAB donor 605. As shown, an IAB node 610 may include mobile termination (MT) functions (also sometimes referred to as UE functions (UEF)) and may include DU functions (also sometimes referred to as access node functions (ANF)). The MT functions of an IAB node 610 (e.g., a child node) may be controlled and/or scheduled by another IAB node 610 (e.g., a parent node of the child node) and/or by an IAB donor 605. The DU functions of an IAB node 610 (e.g., a parent node) may control and/or schedule other IAB nodes 610 (e.g., child nodes of the parent node) and/or UEs 120. Thus, a DU may be referred to as a scheduling node or a scheduling component, and an MT may be referred to as a scheduled node or a scheduled component. In some aspects, an IAB donor 605 may include DU functions and not MT functions. That is, an IAB donor 605 may configure, control, and/or schedule communications of IAB nodes 610 and/or UEs 120. A UE 120 may include only MT functions, and not DU functions. That is, communications of a UE 120 may be controlled and/or scheduled by an IAB donor 605 and/or an IAB node 610 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 605 or an IAB node 610, and a child node may be an IAB node 610 or a UE 120. Communications of an MT function of a child node may be controlled and/or scheduled by a parent node of the child node.

As further shown in FIG. 6, a link between a UE 120 (e.g., which only has MT functions, and not DU functions) and an IAB donor 605, or between a UE 120 and an IAB node 610, may be referred to as an access link 615. Access link 615 may be a wireless access link that provides a UE 120 with radio access to a core network via an IAB donor 605, and optionally via one or more IAB nodes 610. Thus, the network illustrated in FIG. 6 may be referred to as a multi-hop network or a wireless multi-hop network.

As further shown in FIG. 6, a link between an IAB donor 605 and an IAB node 610 or between two IAB nodes 610 may be referred to as a backhaul link 620. Backhaul link 620 may be a wireless backhaul link that provides an IAB node 610 with radio access to a core network via an IAB donor 605, and optionally via one or more other IAB nodes 610. In an IAB network, network resources for wireless communications (e.g., time resources, frequency resources, spatial resources, and/or the like) may be shared between access links 615 and backhaul links 620. In some aspects, a backhaul link 620 may be a primary backhaul link or a secondary backhaul link (e.g., a backup backhaul link). In some aspects, a secondary backhaul link 625 may be used if a primary backhaul link 620 fails, becomes congested, becomes overloaded, and/or the like. For example, a secondary backhaul link 625 between IAB-node 2 and IAB-node 3 may be used for backhaul communications if the primary backhaul link between IAB-node 2 and IAB-node 1 fails. As used herein, "node" or "wireless node" may refer to an IAB donor 605 or an IAB node 610.

As indicated above, FIG. 6 is provided as an example. Other examples may differ from what is described with regard to FIG. 6.

Figure 7:
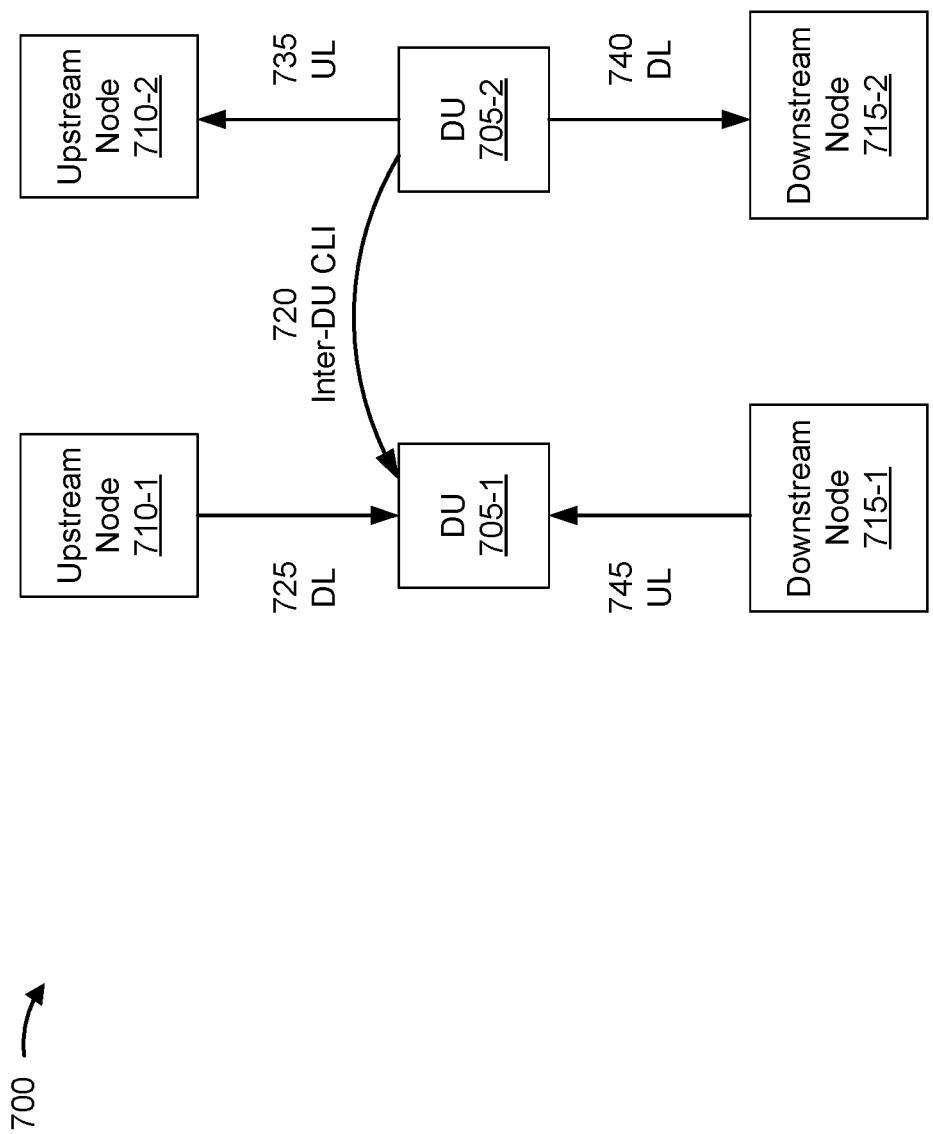
FIG. 7 is a diagram illustrating examples relating to inter-distributed unit (inter-DU) crosslink interference (CLI), in accordance with the present disclosure.

FIG. 7 is a diagram illustrating examples 700 relating to inter-DU CLI, in accordance with the present disclosure.

In dynamic time division duplexing (TDD), the allocation of network resources to uplink and downlink may be dynamically modified depending on a traffic load. For example, a base station CU may configure a TDD configuration (e.g., a TDD pattern) with more uplink transmission time intervals (TTIs) (e.g., frames, subframes, slots, mini-slots, symbols, and/or the like) for a base station DU when the base station DU has uplink data to transmit, and may configure a TDD configuration with more downlink TTIs for the base station DU when the base station DU has downlink data to receive. The TDD configuration may be dynamically configured to modify the allocation of uplink TTIs and downlink TTIs used for communication between the base station DU and associated IAB child nodes, UEs 120, IAB parent nodes, and/or base station CUs.

As shown in FIG. 7, when neighboring base station DUs 705 (705-1 and 705-2) use different TDD configurations to communicate with upstream nodes 710 and/or with downstream nodes 715, this may result in reception at a base station DU 705-1 that at least partially overlaps in the time domain with (e.g., that occurs in a same TTI as) transmission by a neighboring base station DU 705-2. These communications in the same TTI may interfere with one another, which may be referred to as inter-DU CLI 720.

As an example, inter-DU CLI 720 may occur at base station DU 705-1 where reception of a downlink communication 725 from an upstream node 710-1 (e.g., a DU of an IAB parent node, a base station CU, or another type of upstream node) at the base station DU 705-1 at least partially overlaps in the time domain with transmission by base station DU 705-2. The transmission may be of an uplink communication 735 to an upstream node 710-2 (which may be the same node as upstream node 710-1 or a different node, such as another IAB parent node, another base station CU, or another type of upstream node) and/or of a downlink communication 740 to a downstream node 715-2 (e.g., a DU of an IAB child node, a UE, or another type of downstream node).

As another example, inter-DU CLI 720 may occur at base station DU 705-1, where reception of an uplink communication 745 from a downstream node 715-1 (e.g., a DU of an IAB child node, a UE, or another type of upstream node) at the base station DU 705-1 at least partially overlaps in the time domain with transmission by base station DU 705-2 (e.g., transmission of uplink communication 735 and/or of downlink communication 740).

Inter-DU CLI 720 with reception of downlink communication 725 and/or uplink communication 745 can result in reception issues for these communications, such as reduced receive power for downlink communication 725 and/or uplink communication 745, difficulty in demodulating downlink communication 725 and/or uplink communication 745, decoding errors for downlink communication 725 and/or uplink communication 745, and/or other issues. These and other reception issues can result in dropped or un-receivable communications at base station DU 705-1, which can cause reception delays, reduce reliability, and/or an increase in retransmissions (which consumes additional power, memory, processing, and radio resources of base station DU 705-1 and the nodes performing the retransmissions).

As indicated above, FIG. 7 is provided as an example. Other examples are possible and may differ from what was described with respect to FIG. 7.

Some aspects described herein provide techniques and apparatuses for inter-DU CLI measurement and reporting. A DU of a first IAB node may be capable of reusing measurements of an associated MT for inter-DU CLI measurement for a DU of a second IAB node, and may transmit an indication of the capability to a CU of an IAB donor. Moreover, transmissions of an MT associated with the second IAB node may be repurposed for inter-DU CLI measurement for the DU of the second IAB node, and the DU of the second IAB node may transmit an indication of the capability to the CU of the IAB donor. The CU may receive the indications and may configure inter-DU CLI measurement for the DU of the first IAB node, may configure inter-DU CLI measurement transmissions for the DU of the second IAB node, and/or may configure other nodes based at least in part on the indications. In particular, the CU may configure the DU of the first IAB node to reuse the measurements of the associated MT for inter-DU CLI measurement, and/or may configure the MT associated with the DU of the second IAB node to perform one or more transmissions for inter-DU CLI measurement by the DU of the first IAB node and/or the associated MT.

In this way, transmissions and/or measurements by the MTs may be reused for the purpose of inter-DU CLI measurement. The transmissions and/or measurements by the MTs may be used in place of additional inter-DU CLI transmissions and/or measurements by the DUs for inter-DU CLI measurement, which conserves power, memory, processing, and radio resources of the DUs. Alternatively, the transmissions and/or measurements by the MTs may be used in addition to inter-DU CLI transmissions and/or measurements, which may enhance the ability of the DUs and the CU to reduce, mitigate, and/or eliminate inter-DU CLI. This may reduce, mitigate, and/or avoid the reception delays; improve reliability; and/or decrease a quantity of retransmissions that might otherwise result from the inter-DU CLI.

Figure 8:
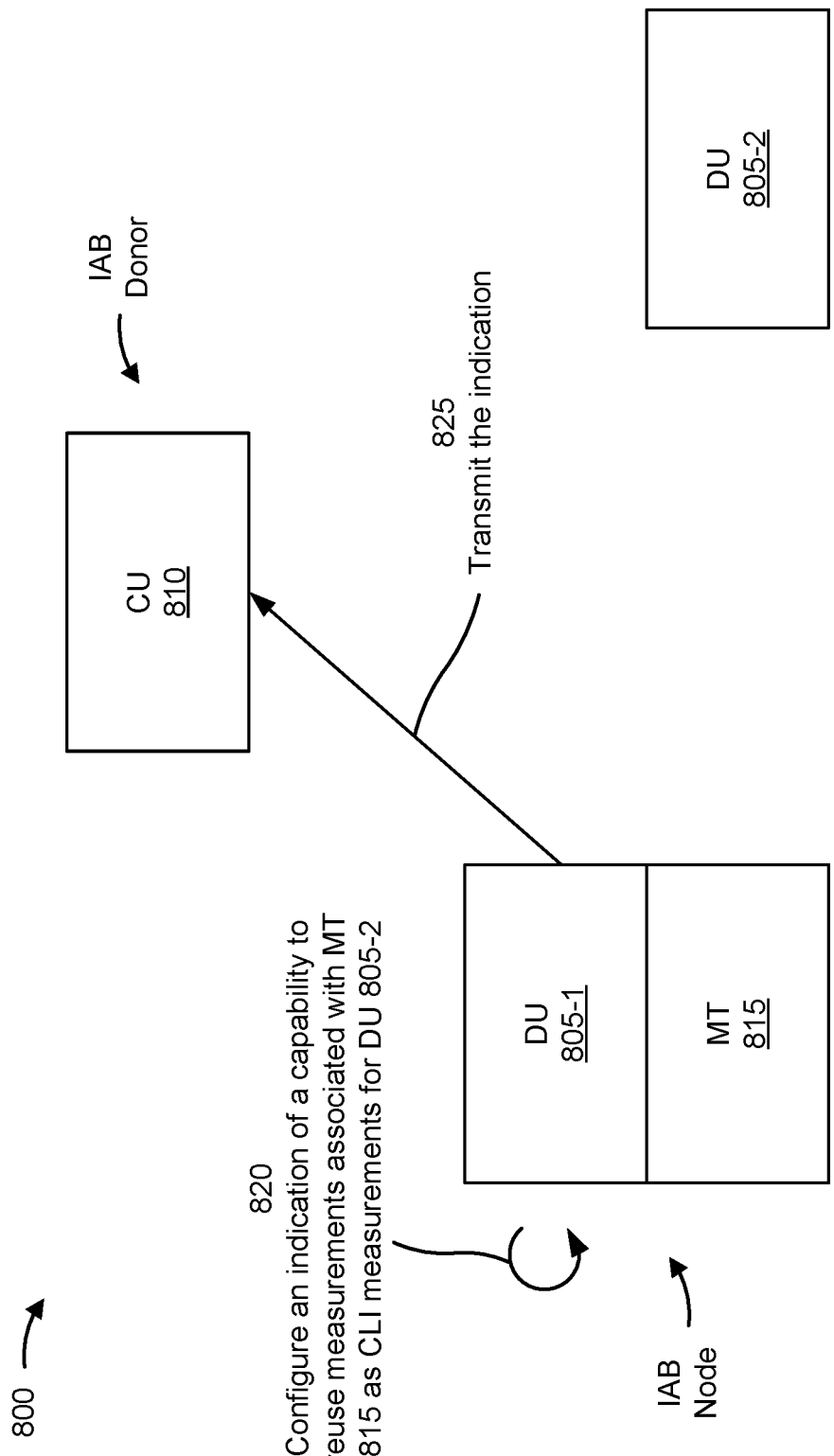
FIGS. 8, 9, 10A, and 10B are diagrams illustrating examples associated with inter-DU CLI measurement and reporting, in accordance with the present disclosure.

FIG. 8 is a diagram illustrating one or more examples 800 associated with inter-DU CLI measurement and reporting, in accordance with the present disclosure. As shown in FIG. 8, example(s) 800 includes communication between a plurality of wireless network nodes, such as a plurality of base station DUs 805 (e.g., base station DU 805-1 and base station DU 805-2), a base station CU 810, and a base station MT 815. In some aspects, the nodes may be included in a wireless network, such as wireless network 100.

The base station DUs 805 may implement, may be implemented by, and/or may be associated with a base station 110, a TRP 308, a DU 406, a DU of a non-anchor base station 545, a DU of an IAB node 610, a base station DU 705, an upstream node 710, and/or a downstream node 715. Base station CU 810 may implement, may be implemented by, and/or may be associated with a base station 110, an ANC 302, a C-RU 404, an anchor base station 535, an IAB donor 605, and/or an upstream node 710. Base station MT 815 may implement, may be implemented by, and/or may be associated with a base station 110, a non-anchor base station 545, and/or an IAB node 610.

The base station DUs 805, base station CU 810, and base station MT 815 may be included in an IAB network such as one or more of the IAB networks illustrated and described above in connection with FIG. 5 and/or FIG. 6. Base station DU 805-1 and base station MT 815 may be associated with the same IAB node, base station DU 805-1 and base station DU 805-2 may be associated with different IAB nodes, and base station CU 810 may be associated with an IAB donor. In some aspects, base station DU 805-1 is associated with an IAB child node of the IAB parent node associated with base station DU 805-2. In some aspects, base station DU 805-2 is associated with an IAB child node of the IAB parent node associated with base station DU 805-1. In some aspects, base station DU 805-1 and base station DU 805-2 are both associated with base station CU 810. In some aspects, base station DU 805-1 is associated with base station CU 810 and base station DU 805-2 is associated with a different base station CU.

Base station DU 805-1 may be located near base station DU 805-2 such that transmissions by base station DU 805-2 in one or more cells of base station DU 805-2 may cause inter-DU CLI with reception by base station DU 805-1 in one or more cells of base station DU 805-1. Accordingly, base station DU 805-1 may be configured to perform CLI measurements of transmissions by base station DU 805-2 (e.g., inter-DU CLI measurements). In some aspects, base station DU 805-1 is configured by base station CU 810 to perform CLI measurements. In some aspects, base station DU 805-1 autonomously performs the CLI measurements.

As shown in FIG. 8, and by reference number 820, base station DU 805-1 may configure an indication of a capability of base station DU 805-1 to reuse measurements associated with and/or performed by base station MT 815 as CLI measurements for inter-DU CLI measurement of base station DU 805-2. In some aspects, base station DU 805-1 is capable of reusing the measurements performed by base station MT 815 based at least in part on being co-located or quasi-co-located with base station MT 815. In some aspects, base station DU 805-1 is capable of reusing the measurements performed by base station MT 815 based at least in part on sharing the same architecture (e.g., the same RF architecture, including sharing the same RF chain, the same antenna, and/or other components). In some aspects, base station DU 805-1 is capable of reusing the measurements performed by base station MT 815 based at least in part on base station DU 805-1 and base station MT 815 being capable of creating beams (e.g., transmit beams, receive beams) in the same spatial directions.

The measurements performed by base station MT 815 may include signal measurements (e.g., RSRP measurements, RSSI measurements, RSRQ measurements, CQI measurements, and/or other types of signal measurements), interference measurements (e.g., signal to noise ratio (SNR) measurements, signal to interference plus noise ratio (SINR) measurements, and/or other types of interference measurements), and/or other types of measurements. In some aspects, base station MT 815 may perform the measurements as part of a measurement configuration, such as a synchronization signal block (SSB) measurement timing configuration (SMTC) for inter-node discovery or another type of measurement configuration.

In some aspects, the indication may indicate a capability of base station DU 805-1 to reuse the measurements performed by base station MT 815 for all inter-DU CLI measurements. In some aspects, the indication may indicate a capability of base station DU 805-1 to reuse a subset of the measurements performed by base station MT 815 for all inter-DU CLI measurements.

In some aspects, the indication may include an implicit indication, such as an indication that base station DU 805-1 and base station MT 815 share the same RF architecture and/or an indication that base station DU 805-1 and base station MT 815 are capable of creating beams in the same spatial direction(s). In some aspects, the indication may include an explicit indication, such as a 1-bit indicator in a field included in a communication that is configured to indicate the capability. In these examples, a first value of the 1-bit indicator may indicate that base station DU 805-1 is not capable of reusing the measurements performed by base station MT 815, and a second value of the 1-bit indicator may indicate that base station DU 805-1 is capable of reusing the measurements performed by base station MT 815.

In some aspects, the indication of the capability may also indicate the cells of base station DU 805-1 for which the measurements performed by base station MT 815 can be reused for inter-DU CLI measurement of base station DU 805-2. In these examples, the indication of the capability may further indicate cell identifiers associated with each of the cells of base station DU 805-1 for which the measurements performed by base station MT 815 can be reused for inter-DU CLI measurement of base station DU 805-2.

In some aspects, the indication of the capability may also indicate one or more beam directions (or spatial directions), supported by base station MT 815, for which the measurements performed by base station MT 815 can be reused for inter-DU CLI measurement of base station DU 805-2. In these examples, the indication of the capability may indicate the SSB identifiers or indices for each of the cells of base station DU 805-1 for which the measurements performed by base station MT 815 can be reused for inter-DU CLI measurement of base station DU 805-2. The cells may be indicated by an associated cell identifier. In some aspects, the indication of the capability may also indicate one or more frequency bands, supported by base station MT 815, for which the measurements performed by base station MT 815 can be reused for inter-DU CLI measurement of base station DU 805-2.

In some aspects, if base station DU 805-2 is associated with another IAB node, base station DU 805-1 may further configure an indication of a capability of base station DU 805-1 to reuse measurements of base station MT 815 that are performed for transmissions from an MT of the IAB node associated with base station DU 805-2. In these cases, base station DU 805-1 may be capable of reusing MT-to-MT measurements performed by base station MT 815 as inter-DU CLI measurements for base station DU 805-2.

As further shown in FIG. 8, and by reference number 825, base station DU 805-1 may transmit the indication of the capability to base station CU 810. In some aspects, base station DU 805-1 transmits the indication based at least in part on receiving a request from base station CU 810 to report the capability to base station CU 810. In some aspects, base station DU 805-1 autonomously transmits the indication to base station CU 810. In some aspects, base station DU 805-1 transmits the indication to base station CU 810 based at least in part on an event, such as establishing a wireless communication link with base station CU 810.

Base station DU 805-1 may transmit the indication of the capability in a control interface communication. In some aspects, base station DU 805 may transmit the indication of the capability on an F1 signaling interface to base station CU 810, such as an F1 control plane (F1-C) interface.

Base station CU 810 may receive the indication of the capability and may configure base station DU 805-1 to reuse the measurements performed by base station MT 815 for the purpose of inter-DU CLI measurement of base station DU 805-2. In these examples, base station MT 815 may provide the results of the measurements to base station DU 805-1, and base station DU 805-1 may transmit the results of the measurements to base station CU 810 in a CLI measurement report.

As indicated above, FIG. 8 is provided as one or more examples. Other examples may differ from what is described with respect to FIG. 8.

Figure 9:
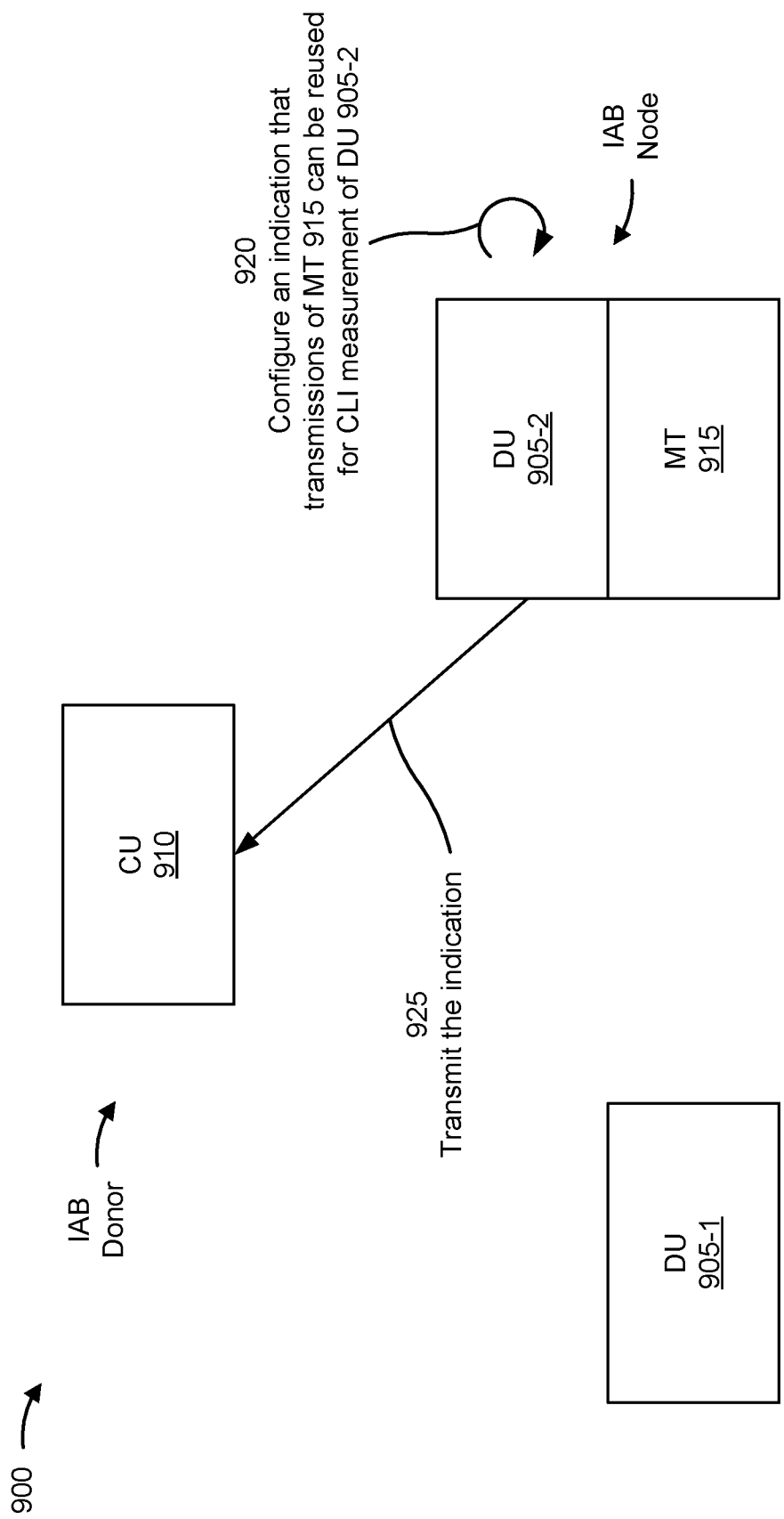

FIG. 9 is a diagram illustrating one or more examples 900 associated with inter-DU CLI measurement and reporting, in accordance with the present disclosure. As shown in FIG. 9, example(s) 900 includes communication between a plurality of wireless network nodes, such as a plurality of base station DUs 905 (e.g., base station DU 905-1 and base station DU 905-2), a base station CU 910, and a base station MT 915. In some aspects, the nodes may be included in a wireless network, such as wireless network 100.

The base station DUs 905 may implement, may be implemented by, and/or may be associated with a base station 110, a TRP 308, a DU 406, a DU of a non-anchor base station 545, a DU of an IAB node 610, a base station DU 705, an upstream node 710, and/or a downstream node 715. Base station CU 910 may implement, may be implemented by, and/or may be associated with a base station 110, an ANC 302, a C-RU 404, an anchor base station 535, an IAB donor 605, and/or an upstream node 710. Base station MT 915 may implement, may be implemented by, and/or may be associated with a base station 110, a non-anchor base station 545, and/or an IAB node 610.

The base station DUs 905, base station CU 910, and base station MT 915 may be included in an IAB network such as one or more of the IAB networks illustrated and described above in connection with FIG. 5 and/or FIG. 6. Base station DU 905-2 and base station MT 915 may be associated with the same IAB node, base station DU 905-1 and base station DU 905-2 may be associated with different IAB nodes, and base station CU 910 may be associated with an IAB donor. In some aspects, base station DU 905-1 is associated with an IAB child node of the IAB parent node associated with base station DU 905-2. In some aspects, base station DU 905-2 is associated with an IAB child node of the IAB parent node associated with base station DU 905-1. In some aspects, base station DU 905-1 and base station DU 905-2 are both associated with base station CU 910. In some aspects, base station DU 905-1 is associated with base station CU 910 and base station DU 905-2 is associated with a different base station CU.

Base station DU 905-1 may be located near base station DU 905-2 such that transmissions by base station DU 905-2 in one or more cells of base station DU 905-2 may cause inter-DU CLI with reception by base station DU 905-1 in one or more cells of base station DU 905-1. Accordingly, base station DU 905-1 may be configured to perform CLI measurements of transmissions by base station DU 905-2 (e.g., inter-DU CLI measurements). In some aspects, base station DU 905-1 is configured by base station CU 910 to perform CLI measurements. In some aspects, base station DU 905-1 autonomously performs the CLI measurements.

As shown in FIG. 9, and by reference number 920, base station DU 905-2 may configure an indication that transmissions performed by base station MT 915 can be reused for CLI measurements for inter-DU CLI measurement of base station DU 905-2. In some aspects, the transmissions performed by base station MT 915 are reusable for inter-DU CLI measurement of base station DU 905-2 based at least in part on base station MT 915 and base station DU 905-2 being co-located or quasi-co-located. In some aspects, the transmissions performed by base station MT 915 are reusable for inter-DU CLI measurement of base station DU 905-2 based at least in part on base station MT 915 and base station DU 905-2 sharing the same architecture (e.g., the same RF architecture, including the same RF chain, the same antenna, and/or other components). In some aspects, the transmissions performed by base station MT 915 are reusable for inter-DU CLI measurement of base station DU 905-2 based at least in part on base station MT 915 and base station DU 905-2 being capable of creating beams (e.g., transmit beams, receive beams) in the same spatial directions.

The transmissions performed by base station MT 915 may include reference signal transmissions (e.g., channel state information reference signals (CSI-RSs), demodulation reference signals (DMRSs), sounding reference signals (SRSs), and/or other types of reference signals), SSB transmissions, data transmissions, and/or other types of transmissions. In some aspects, base station MT 915 performs the transmissions as part of a transmission configuration, such as an SSB transmission configuration (STC) for inter-node discovery or another type of transmission configuration.

In some aspects, the indication may indicate that all transmissions performed by base station MT 915 can be reused for CLI measurements for inter-DU CLI measurement of base station DU 905-2. In some aspects, the indication may indicate that a subset of transmissions performed by base station MT 915 can be reused for CLI measurements for inter-DU CLI measurement of base station DU 905-2.

In some aspects, the indication may include an implicit indication, such as an indication that base station DU 905-2 and base station MT 915 share the same RF architecture and/or an indication that base station DU 905-2 and base station MT 915 are capable of creating beams in the same spatial direction(s). In some aspects, the indication may include an explicit indication, such as a 1-bit indicator in a field included in a communication that is configured to indicate that transmissions performed by base station MT 915 can be reused for CLI measurements for inter-DU CLI measurement of base station DU 905-2. In these examples, a first value of the 1-bit indicator may indicate that transmissions performed by base station MT 915 cannot be reused for CLI measurements for inter-DU CLI measurement of base station DU 905-2, and a second value of the 1-bit indicator may indicate that transmissions performed by base station MT 915 can be reused for CLI measurements for inter-DU CLI measurement of base station DU 905-2.

In some aspects, the indication may also indicate the cells of base station DU 905-2 for which transmissions performed by base station MT 915 can be reused for CLI measurements for inter-DU CLI measurement of base station DU 905-2. In these examples, the indication may further indicate cell identifiers associated with each of the cells of base station DU 905-2 for which transmissions performed by base station MT 915 can be reused for CLI measurements for inter-DU CLI measurement of base station DU 905-2.

In some aspects, the indication may also indicate one or more beam directions (or spatial directions), supported by base station MT 915, for which transmissions performed by base station MT 915 can be reused for CLI measurements for inter-DU CLI measurement of base station DU 905-2. In these examples, the indication may further indicate a list of SSB identifiers or indices for each cell of base station DU 905-2 for which transmissions performed by base station MT 915 can be reused for CLI measurements for inter-DU CLI measurement of base station DU 905-2. The cells may be indicated by an associated cell identifier. In some aspects, the indication may also indicate one or more frequency bands, supported by base station MT 915, for which transmissions performed by base station MT 915 can be reused for CLI measurements for inter-DU CLI measurement of base station DU 905-2.

As further shown in FIG. 9, and by reference number 925, base station DU 905-1 may transmit the indication of the capability to base station CU 910. In some aspects, base station DU 905-2 transmits the indication based at least in part on receiving a request from base station CU 910 to report the capability to base station CU 910. In some aspects, base station DU 905-2 autonomously transmits the indication to base station CU 910. In some aspects, base station DU 905-2 transmits the indication to base station CU 910 based at least in part on an event, such as establishing a wireless communication link with base station CU 910.

Base station DU 905-1 may transmit the indication of the capability in a control interface communication. In some aspects, base station DU 905-2 transmits the indication of the capability on an F1 signaling interface to base station CU 910, such as an F1-C interface.

Base station CU 910 may receive the indication and may configure base station MT 915 to perform transmissions for inter-DU CLI measurement of base station DU 905-2. Moreover, base station CU 910 may configure base station DU 905-1 to perform measurements of the transmissions for inter-DU CLI measurement of base station DU 905-2. In some aspects, if base station DU 905-1 is associated with another IAB node, base station CU 910 may configure an MT associated with the other IAB node to perform MT-to-MT measurements of the transmissions, and to provide the results of the MT-to-MT measurements to base station DU 905-1. In these examples, base station MT 915 may provide the results of the measurements to base station DU 905-1, and base station DU 905-1 may transmit the results of the measurements to base station CU 910 in a CLI measurement report.

As indicated above, FIG. 9 is provided as one or more examples. Other examples may differ from what is described with respect to FIG. 9.

Figure 10A:
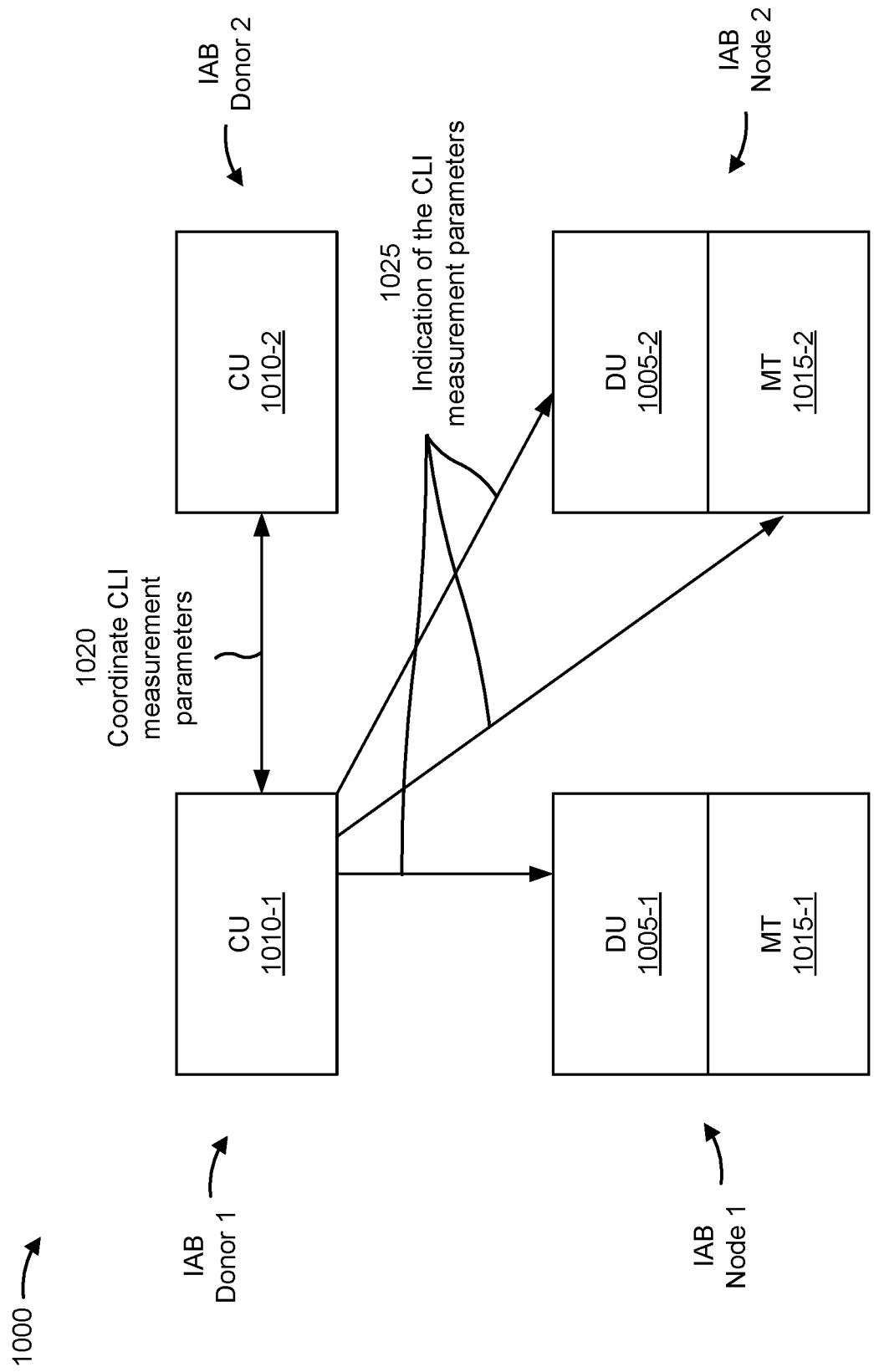
Figure 10B:
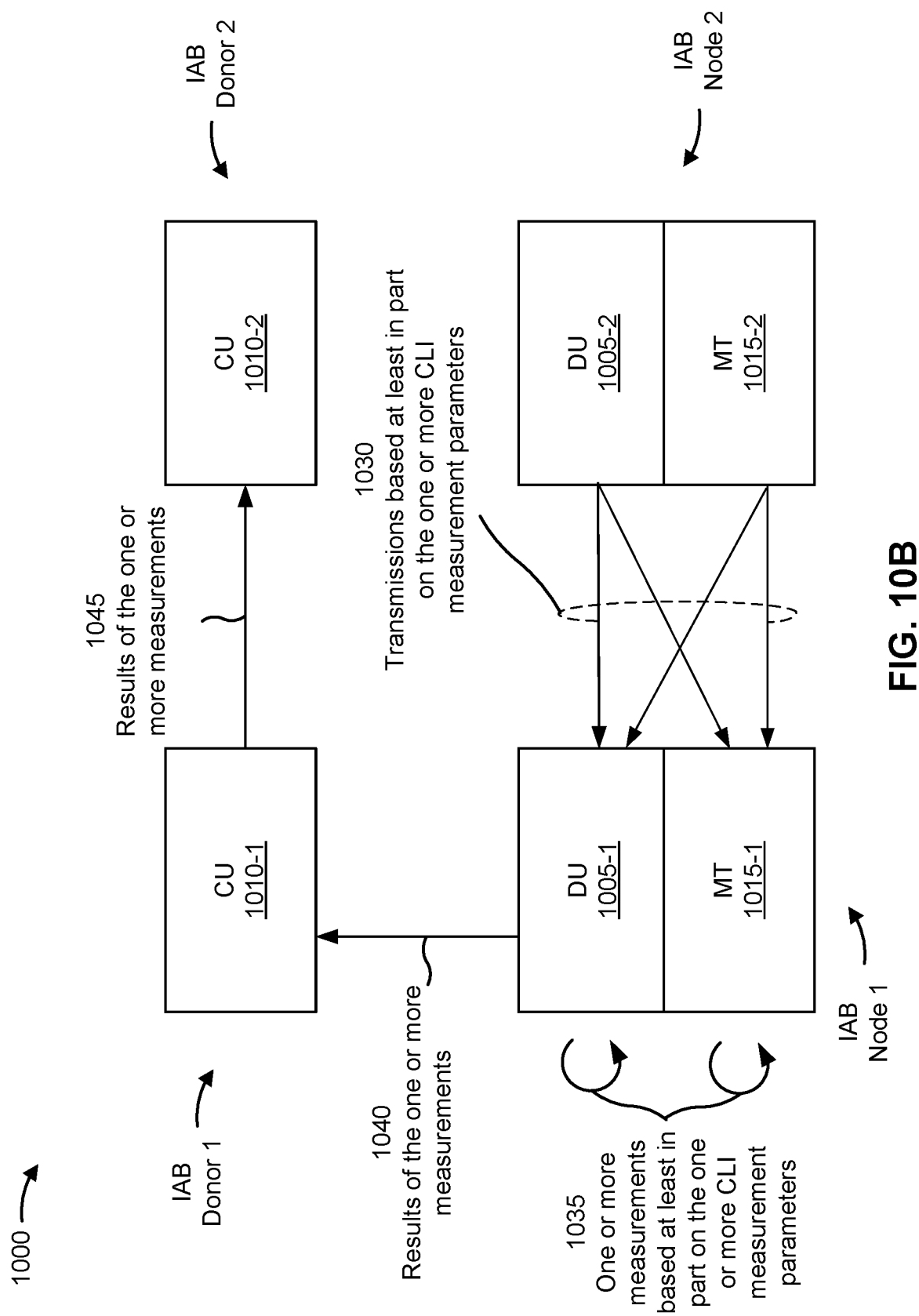

FIGS. 10A and 10B are diagrams illustrating one or more examples 1000 associated with inter-DU CLI measurement and reporting, in accordance with the present disclosure. As shown in FIG. 10, example(s) 1000 includes communication between a plurality of wireless network nodes, such as a plurality of base station DUs 1005 (e.g., base station DU 1005-1 and base station DU 1005-2), a plurality of base station CUs 1010 (e.g., base station CU 1010-1 and base station CU 1010-2), and a plurality of base station MTs 1015 (e.g., base station MT 1015-1 and base station MT 1015-2). In some aspects, the nodes may be included in a wireless network, such as wireless network 100.

The base station DUs 1005 may implement, may be implemented by, and/or may be associated with a base station 110, a TRP 308, a DU 406, a DU of a non-anchor base station 545, a DU of an IAB node 610, a base station DU 705, an upstream node 710, and/or a downstream node 715. The base station CUs 1010 may implement, may be implemented by, and/or may be associated with a base station 110, an ANC 302, a C-RU 404, an anchor base station 535, an IAB donor 605, and/or an upstream node 710. The base station MTs 1015 may implement, may be implemented by, and/or may be associated with a base station 110, a non-anchor base station 545, and/or an IAB node 610.

Base station DU 1005-1 and base station MT 1015-1 may be associated with a first IAB node, and base station DU 1005-2 and base station MT 1015-2 may be associated with a second (different) IAB node. Base station CU 1010-1 may be associated with a first IAB donor, and base station CU 1010-2 may be associated with a second (different) IAB donor. The first IAB donor may be an IAB donor for the first IAB node, and the second IAB donor may be an IAB donor for the second IAB node.

Base station DU 1005-1 may be located near base station DU 1005-2 such that transmissions by base station DU 1005-2 in one or more cells of base station DU 1005-2 may cause inter-DU CLI with reception by base station DU 1005-1 in one or more cells of base station DU 1002-1. Accordingly, base station DU 1005-1 may be configured to perform CLI measurements of transmissions by base station DU 1005-2 (e.g., inter-DU CLI measurements).

As shown in FIG. 10A and by reference number 1020, base station CU 1010-1 and base station CU 1010-2 may coordinate one or more CLI measurement parameters. For example, base station CU 1010-1 and base station CU 1010-2 may coordinate indications of various capabilities of base station DU 1005-1 and base station DU 10005-2, such as the capability of base station DU 1005-1 to reuse measurements performed by base station MT 1015-1 for inter-DU CLI measurement, a capability for transmissions by base station MT 1015-2 to be reused for inter-DU CLI measurement of base station DU 10005-2, and/or other capabilities. In these examples, base station CU 1010-1 and base station CU 1010-2 may coordinate the transmission of one or more uplink signals by base station DU 1005-2 and base station MT 1015-2 for inter-DU CLI measurement, and/or may coordinate one or more measurements by base station DU 1005-1 and/or base station MT 1015-1 for inter-DU CLI measurement based at least in part on the capabilities.

As another example, base station CU 1010-1 and base station CU 1010-2 may coordinate the time-domain resources and/or the frequency-domain resources in which base station DU 1005-2 and/or base station MT 1015-2 are to perform transmissions for CLI measurement, and in which base station DU 1005-1 and/or base station MT 1015-1 are to perform measurements of the transmissions for inter-DU CLI measurement. As another example, base station CU 1010-1 and base station CU 1010-2 coordinate the beams on which base station DU 1005-2 and/or base station MT 1015-2 are to perform the transmissions, the cells for which base station DU 1005-2 and/or base station MT 1015-2 are to perform the transmissions, the types of transmissions that base station DU 1005-2 and/or base station MT 1015-2 are to perform, the types of measurements base station DU 1005-1 and/or base station MT 1015-1 are to perform, and/or other parameters.

As further shown in FIG. 10A, and by reference number 1025, base station CU 1010-1 may transmit an indication of the one or more CLI measurement parameters to one or more nodes, including base station DU 1005-1, base station DU 1005-2, base station MT 1015-2, and/or other nodes. In some aspects, base station CU 1010-1 transmits the indication of the one or more CLI measurement parameters directly to base station DU 1005-1 or through an intervening IAB node (e.g., an IAB parent node of the first IAB node associated with base station DU 1005-1). In some aspects, base station CU 1010-1 transmits the indication of the one or more CLI measurement parameters directly to base station DU 1005-2 and/or directly to base station MT 1015-2. In some aspects, base station CU 1010-1 transmits the indication of the one or more CLI measurement parameters to base station DU 1005-2 and/or directly to base station MT 1015-2 through base station CU 1010-2.

As shown in FIG. 10B, and by reference number 1030, base station DU 1005-2 and base station MT 1015-2 may perform one or more transmissions based at least in part on the one or more CLI measurement parameters. For example, base station DU 1005-2 and base station MT 1015-2 may perform the one or more transmissions based at least in part on the time-domain resources and/or the frequency-domain resources indicated in the one or more CLI measurement parameters, may perform the one or more transmissions based at least in part on the transmission types indicated in the one or more CLI measurement parameters, and/or may perform the one or more transmissions based at least in part on other CLI measurement parameters.

As further shown in FIG. 10B, and by reference number 1035, base station DU 1005-1 and base station MT 1015-1 may perform one or more measurements of the one or more transmissions based at least in part on the one or more CLI measurement parameters. The one or more measurements may include DU-to-DU measurements (e.g., measurements by base station DU 1005-1 based at least in part on transmissions by base station DU 1005-2), DU-to-MT measurements (e.g., measurements by base station DU 1005-1 based at least in part on transmissions by base station MT 1015-2), MT-to-DU measurements (e.g., measurements by base station MT 1015-1 based at least in part on transmissions by base station DU 1005-2) and/or MT-to-MT measurements (e.g., measurements by base station MT 1015-1 based at least in part on transmissions by base station MT 1015-2). For example, base station DU 1005-1 and base station MT 1015-1 may perform the one or more measurements based at least in part on the time-domain resources and/or the frequency-domain resources indicated in the one or more CLI measurement parameters, may perform the one or more measurements based at least in part on the measurement types indicated in the one or more CLI measurement parameters, and/or may perform the one or more transmissions based at least in part on other CLI measurement parameters.

As further shown in FIG. 10B, and by reference number 1040, base station DU 1005-1 may transmit results of the one or more measurements (and, in some cases, additional information associated with the one or more measurements) to base station CU 1010-1. If base station MT 1015-1 performed at least a subset of the measurements, base station MT 1015-1 may provide the results of the subset to base station DU 1005-1, and base station DU 1005-1 may provide the results of the subset to base station CU 1010-1.

As further shown in FIG. 10B, and by reference number 1045, base station CU 1010-1 may coordinate the results (and actions that are to be performed based at least in part on the results) with base station CU 1010-2. In these examples, base station CU 1010-1 may transmit the results of the one or more measurements to base station CU 1010-2.

As indicated above, FIGS. 10A and 10B are provided as one or more examples. Other examples may differ from what is described with respect to FIGS. 10A and 10B.

FIG. 11 is a diagram illustrating an example process 1100 performed, for example, by a DU of a first IAB node, in accordance with the present disclosure. Example process 1100 is an example where the DU (e.g., a base station 110, a TRP 308, a DU 406, a DU of a non-anchor base station 545, a DU of an IAB node 610, a base station DU 705, a base station DU 805, a base station DU 905, a base station DU 1005, and/or an apparatus 1400) performs operations associated with inter-DU CLI measurement and reporting.

As shown in FIG. 11, in some aspects, process 1100 may include configuring an indication of a capability to reuse measurements, associated with an MT of the first IAB node, as CLI measurements for a DU of a second IAB node (block 1110). For example, the DU (e.g., using configuration component 1408, depicted in FIG. 14) may configure an indication of a capability to reuse measurements, associated with an MT of the first IAB node, as CLI measurements for a DU of a second IAB node, as described above.

As further shown in FIG. 11, in some aspects, process 1100 may include transmitting the indication to a CU of an IAB donor (block 1120). For example, the DU (e.g., using transmission component 1404, depicted in FIG. 14) may transmit the indication to a CU of an IAB donor, as described above.

Process 1100 may include additional aspects, such as any single aspect or any combination of aspects described below and/or in connection with one or more other processes described elsewhere herein.

In a first aspect, configuring the indication of the capability comprises configuring an indication that the DU of the first IAB node and the MT of the first IAB node share a same RF architecture, wherein the indication that the DU of the first IAB node and the MT of the first IAB node share the same RF architecture implicitly indicates the capability to reuse measurements, associated with the MT of the first IAB node, as CLI measurements for the DU of the second IAB node. In a second aspect, alone or in combination with the first aspect, configuring the indication of the capability comprises configuring a 1-bit indicator to explicitly indicate the capability. In a third aspect, alone or in combination with one or more of the first and second aspects, configuring the indication of the capability comprises configuring an indication of one or more cell identifiers associated with the DU of the first IAB for which measurements associated with the MT of the first IAB node can be reused as CLI measurements for the DU of the second IAB node.

In a fourth aspect, alone or in combination with one or more of the first through third aspects, configuring the indication of the capability comprises configuring an indication of at least one of one or more beam directions supported by the MT of the first IAB node or one or more frequency bands supported by the MT of the first IAB node. In a fifth aspect, alone or in combination with one or more of the first through fifth aspects, the indication of the one or more beam directions includes an indication of one or more SSB indices, associated with one or more cell identifiers, that correspond to one or more beam directions.

In a sixth aspect, alone or in combination with one or more of the first through fifth aspects, process 1100 includes configuring (e.g., using configuration component 1408, depicted in FIG. 14) another indication of a capability to reuse measurements, of an MT of the second IAB node performed by the MT of the first IAB node, as CLI measurements for the DU of the second IAB node, and transmitting the other indication to the CU of the IAB donor.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a DU of an IAB node, in accordance with the present disclosure. Example process 1200 is an example where the DU (e.g., a base station 110, a TRP 308, a DU 406, a DU of a non-anchor base station 545, a DU of an IAB node 610, a base station DU 705, a base station DU 805, a base station DU 905, a base station DU 1005, and/or an apparatus 1500) performs operations associated with inter-DU CLI measurement and reporting.

As shown in FIG. 12, in some aspects, process 1200 may include configuring an indication that transmissions of an MT of the IAB node can be used for CLI measurement of the DU of the IAB node (block 1210). For example, the DU (e.g., using configuration component 1508, depicted in FIG. 15) may configure an indication that transmissions of an MT of the IAB node can be used for CLI measurement of the DU of the IAB node, as described above.

As further shown in FIG. 12, in some aspects, process 1200 may include transmitting the indication to a CU of an IAB donor (block 1220). For example, the DU (e.g., using transmission component 1504, depicted in FIG. 15) may transmit the indication to a CU of an IAB donor, as described above.

Process 1200 may include additional aspects, such as any single aspect or any combination of aspects described below and/or in connection with one or more other processes described elsewhere herein.

In a first aspect, configuring the indication that transmissions of the MT of the IAB node can be used for CLI measurement of the DU of the IAB node comprises configuring an indication that the DU of the IAB node and the MT of the IAB node share a same RF architecture, wherein the indication that the DU of the IAB node and the MT of the first IAB node share the same RF architecture implicitly indicates that transmissions of the MT of the IAB node can be used for CLI measurement of the DU of the IAB node. In a second aspect, alone or in combination with the first aspect, configuring the indication that transmissions of the MT of the IAB node can be used for CLI measurement of the DU of the IAB node comprises configuring a 1-bit indicator to explicitly indicate that transmissions of the MT of the IAB node can be used for CLI measurement of the DU of the IAB node.

In a third aspect, alone or in combination with one or more of the first and second aspects, configuring the indication that transmissions of the MT of the IAB node can be used for CLI measurement of the DU of the IAB node comprises configuring an indication of one or more cell identifiers associated with the DU of the IAB node for which transmissions of the MT of the IAB node can be used for CLI measurement of the DU of the IAB node. In a fourth aspect, alone or in combination with one or more of the first through third aspects, configuring the indication that transmissions of the MT of the IAB node can be used for CLI measurement of the DU of the IAB node comprises configuring an indication of at least one of one or more beam directions supported by the MT of the IAB node or one or more frequency bands supported by the MT of the IAB node.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
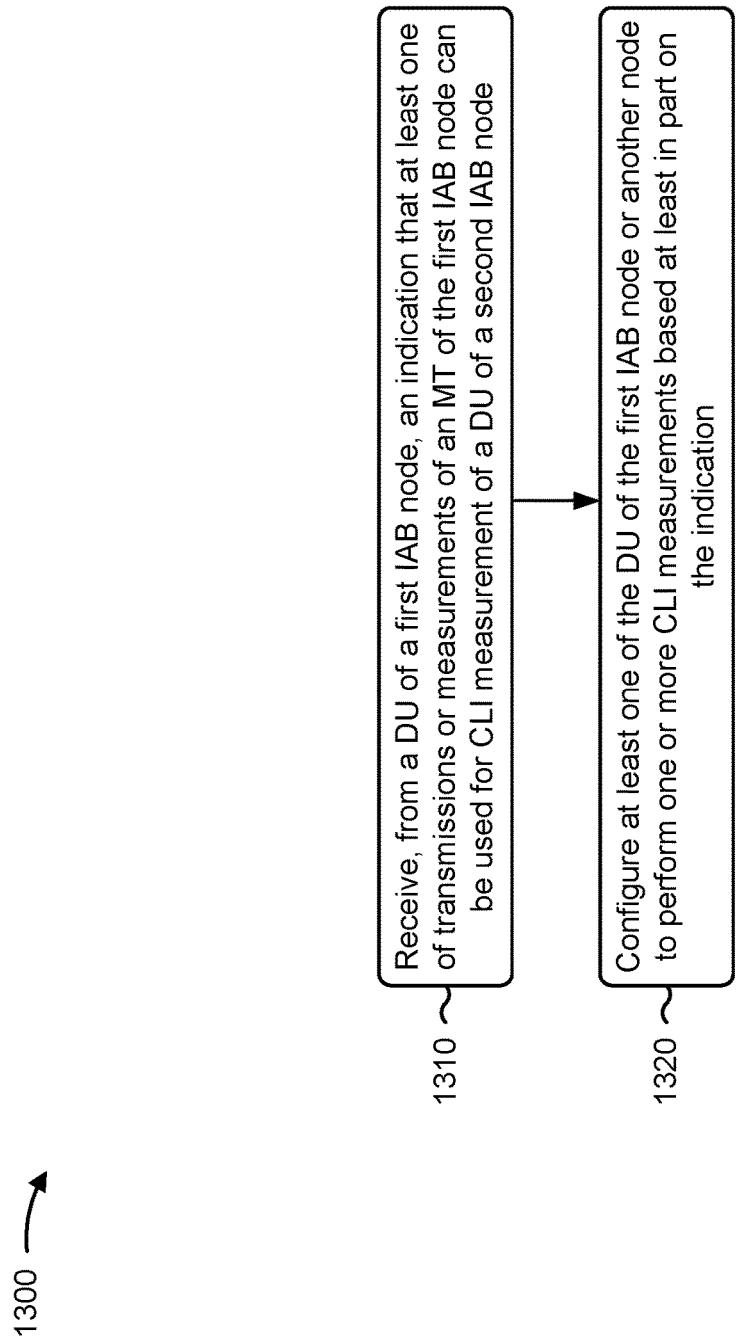

FIG. 13 is a diagram illustrating an example process 1300 performed, for example, by a CU of an IAB donor, in accordance with the present disclosure. Example process 1300 is an example where the CU (e.g., a base station 110, an ANC 302, a C-RU 404, a CU of an anchor base station 535, a CU of an IAB donor 605, an upstream node 710, a base station CU 810, a base station CU 910, a base station CU 1010, and/or an apparatus 1600) performs operations associated with inter-DU CLI measurement and reporting.

As shown in FIG. 13, in some aspects, process 1300 may include receiving, from a DU of a first IAB node, an indication that at least one of transmissions or measurements of an MT of the first IAB node can be used for CLI measurement of a DU of a second IAB node (block 1310). For example, the CU (e.g., using reception component 1602, depicted in FIG. 16) may receive, from a DU of a first IAB node, an indication that at least one of transmissions or measurements of an MT of the first IAB node can be used for CLI measurement of a DU of a second IAB node, as described above.

As further shown in FIG. 13, in some aspects, process 1300 may include configuring at least one of the DU of the first IAB node or another node to perform one or more CLI measurements based at least in part on the indication (block 1320). For example, the CU (e.g., using configuration component 1608, depicted in FIG. 16) may configure at least one of the DU of the first IAB node or another node to perform one or more CLI measurements based at least in part on the indication, as described above.

Process 1300 may include additional aspects, such as any single aspect or any combination of aspects described below and/or in connection with one or more other processes described elsewhere herein.

In a first aspect, process 1300 includes configuring (e.g., using configuration component 1608, depicted in FIG. 16) an MT of the second IAB node to transmit one or more uplink signals for CLI measurement based at least in part on the indication. In a second aspect, alone or in combination with the first aspect, the one or more CLI measurements comprise at least one of one or more RSRP measurements, one or more RSSI measurements, one or more SNR measurements, or one or more SINR measurements.

In a third aspect, alone or in combination with one or more of the first and second aspects, the DU of the first IAB node is associated with the CU of the IAB donor, the DU of the second IAB node is associated with a CU of another IAB donor, and process 1300 includes coordinating (e.g., using coordination component 1610, depicted in FIG. 16), with the CU of the other IAB donor, at least one of one or more uplink signals to be transmitted by an MT of the second IAB node for the one or more CLI measurements based at least in part on the indication, one or more measurement resources for one or more CLI measurements based at least in part on the indication, or results of the one or more CLI measurements.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
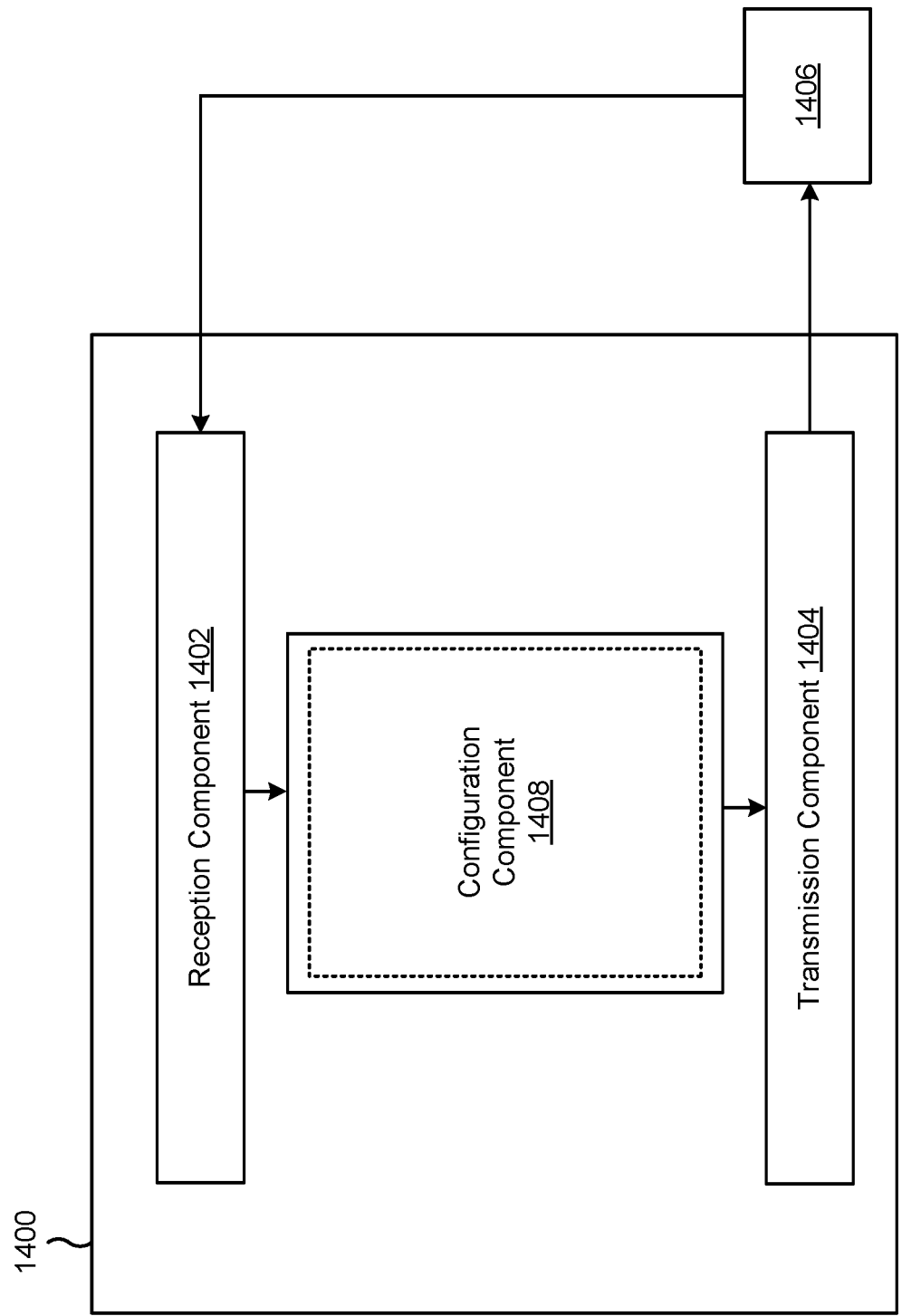
FIGS. 14-16 are block diagrams of example apparatuses for wireless communication, in accordance with the present disclosure.

FIG. 14 is a block diagram of an example apparatus 1400 for wireless communication. The apparatus 1400 may be a DU of an IAB node, or a DU of an IAB node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, a DU of another IAB node, a CU of an IAB donor, or another wireless communication device) using the reception component 1402 and the transmission component 1404. As further shown, the apparatus 1400 may include a configuration component 1408.

In some aspects, the apparatus 1400 may be configured to perform one or more operations described herein in connection with FIGS. 8-13. Additionally or alternatively, the apparatus 1400 may be configured to perform one or more processes described herein, such as process 1100 of FIG. 11. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The configuration component 1408 may configure an indication of a capability to reuse measurements, associated with an MT of a first IAB node, as CLI measurements for a DU of a second IAB node. In some aspects, the configuration component 1408 may include one or more antennas, a demodulator, a MIMO detector, a receive processor, a modulator, a transmit MIMO processor, a transmit processor, a controller/processor, a memory, or a combination thereof, of the base station described above in connection with FIG. 2. The transmission component 1404 may transmit the indication to the apparatus 1606.

The configuration component 1408 may configure another indication of a capability to reuse measurements, of an MT of the second IAB node performed by the MT of the first IAB node, as CLI measurements for the DU of the second IAB node. The transmission component 1404 may transmit the other indication to the CU of the IAB donor.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
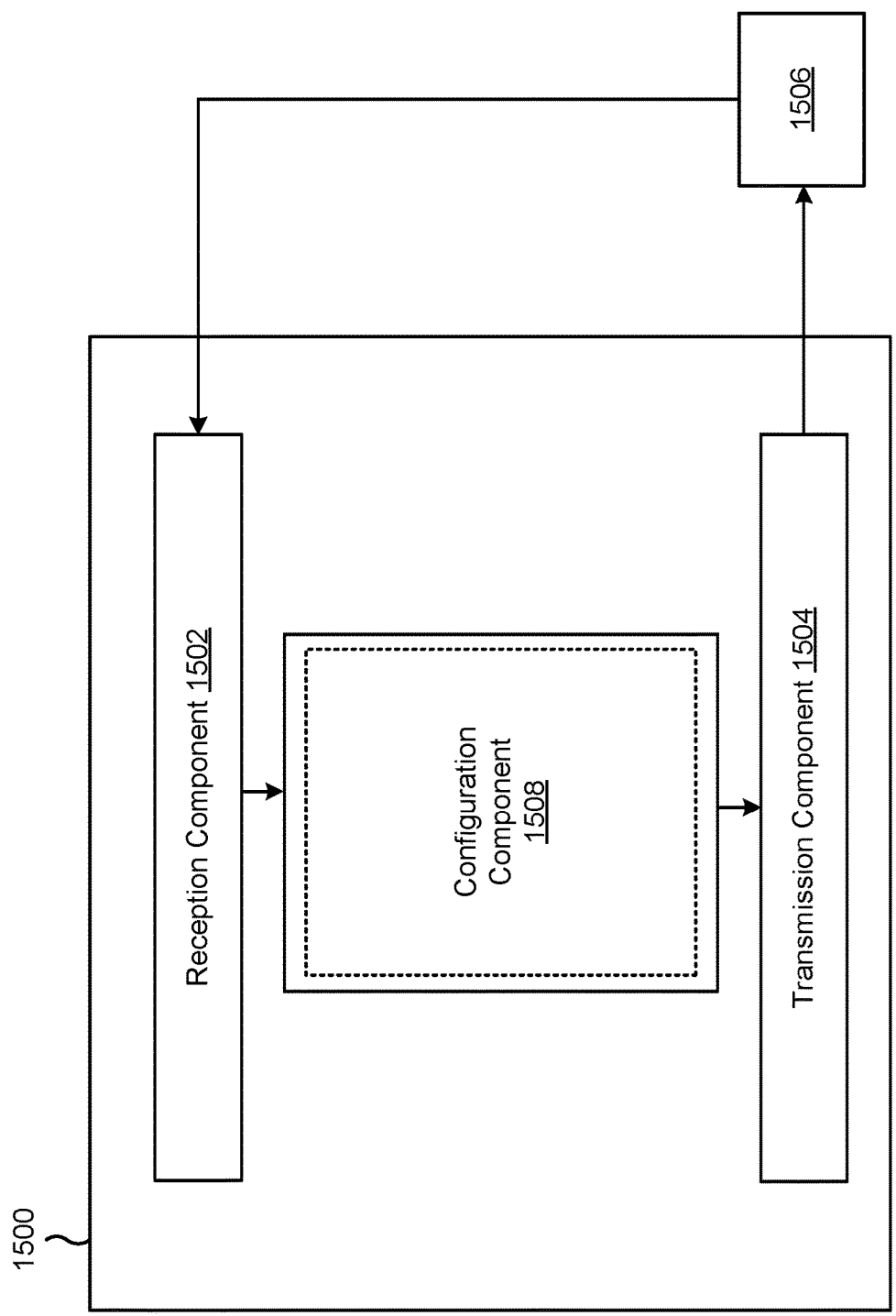

FIG. 15 is a block diagram of an example apparatus 1500 for wireless communication. The apparatus 1500 may be a DU of an IAB node, or a DU of an IAB node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a configuration component 1508.

In some aspects, the apparatus 1500 may be configured to perform one or more operations described herein in connection with FIGS. 8-13. Additionally or alternatively, the apparatus 1500 may be configured to perform one or more processes described herein, such as process 1200 of FIG. 12. In some aspects, the apparatus 1500 and/or one or more components shown in FIG. 15 may include one or more components of the base station described above in connection with FIG. 2. Additionally, or alternatively, one or more components shown in FIG. 15 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the base station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the base station described above in connection with FIG. 2. In some aspects, the transmission component 1504 may be co-located with the reception component 1502 in a transceiver.

The configuration component 1508 may configure an indication that transmissions of an MT of an IAB node can be used for CLI measurement of the apparatus 1500. In some aspects, the configuration component 1508 may include one or more antennas, a demodulator, a MIMO detector, a receive processor, a modulator, a transmit MIMO processor, a transmit processor, a controller/processor, a memory, or a combination thereof, of the DU of an IAB node described above in connection with FIG. 2. The transmission component 1504 may transmit the indication to the apparatus 1506.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
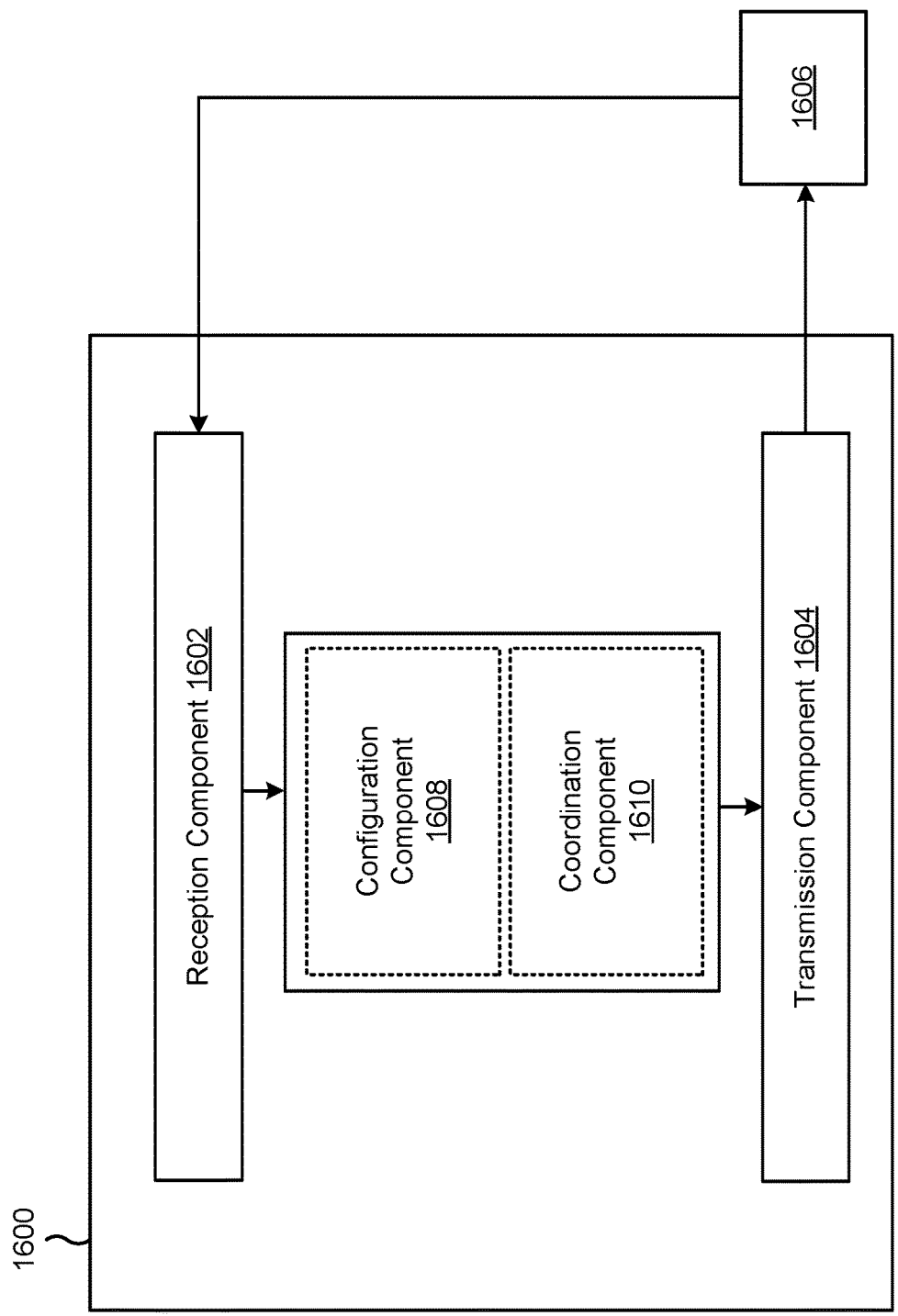

FIG. 16 is a block diagram of an example apparatus 1600 for wireless communication. The apparatus 1600 may be a CU of an IAB donor, or a CU of an IAB donor may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include one or more of a configuration component 1608, a coordination component 1610, among other examples.

In some aspects, the apparatus 1600 may be configured to perform one or more operations described herein in connection with FIGS. 8-13. Additionally or alternatively, the apparatus 1600 may be configured to perform one or more processes described herein, such as process 1300 of FIG. 13. In some aspects, the apparatus 1600 and/or one or more components shown in FIG. 16 may include one or more components of the base station described above in connection with FIG. 2. Additionally, or alternatively, one or more components shown in FIG. 16 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the base station described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the base station described above in connection with FIG. 2. In some aspects, the transmission component 1604 may be co-located with the reception component 1602 in a transceiver.

The reception component 1602 may receive, from a first apparatus 1606 of a first IAB node, an indication that at least one of transmissions or measurements of an MT of a first IAB node can be used for CLI measurement of a second apparatus 1606 of a second IAB node. The configuration component 1608 may configure at least one of the first apparatus 1606, the second apparatus 1606, or another node to perform one or more CLI measurements based at least in part on the indication. In some aspects, the configuration component 1608 may include one or more antennas, a demodulator, a MIMO detector, a receive processor, a modulator, a transmit MIMO processor, a transmit processor, a controller/processor, a memory, or a combination thereof, of the CU of an IAB donor described above in connection with FIG. 2. The configuration component 1608 may configure an MT of the second IAB node to transmit one or more uplink signals for CLI measurement based at least in part on the indication.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a distributed unit (DU) of a first integrated access and backhaul (IAB) node, comprising: configuring an indication of a capability to reuse measurements, associated with a mobile terminal (MT) of the first IAB node, as crosslink interference (CLI) measurements for a DU of a second IAB node; and transmitting the indication to a central unit (CU) of an IAB donor.

Aspect 2: The method of Aspect 1, wherein configuring the indication of the capability comprises: configuring an indication that the DU of the first IAB node and the MT of the first IAB node share a same radio frequency (RF) architecture. Aspect 3: The method of Aspect 2, wherein the indication that the DU of the first IAB node and the MT of the first IAB node share the same RF architecture implicitly indicates the capability to reuse measurements, associated with the MT of the first IAB node, as CLI measurements for the DU of the second IAB node.

Aspect 4: The method of any of Aspects 1-3, wherein configuring the indication of the capability comprises: configuring a 1-bit indicator to explicitly indicate the capability. Aspect 5: The method of any of Aspects 1-4, wherein configuring the indication of the capability comprises: configuring an indication of one or more cell identifiers associated with the DU of the first IAB for which measurements associated with the MT of the first IAB node can be reused as CLI measurements for the DU of the second IAB node.

Aspect 6: The method of any of Aspects 1-5, wherein configuring the indication of the capability comprises: configuring an indication of at least one of one or more beam directions supported by the MT of the first IAB node or one or more frequency bands supported by the MT of the first IAB node. Aspect 7: The method of Aspect 5, wherein the indication of the one or more beam directions includes an indication of one or more synchronization signal block (SSB) indices, associated with one or more cell identifiers, that correspond to one or more beam directions.

Aspect 8: The method of any of Aspects 1-7, further comprising: configuring another indication of a capability to reuse measurements, of an MT of the second IAB node performed by the MT of the first IAB node, as CLI measurements for the DU of the second IAB node. Aspect 9: The method of Aspect 8, further comprising: transmitting the other indication to the CU of the IAB donor.

Aspect 10: A method of wireless communication performed by a distributed unit (DU) of an integrated access and backhaul (IAB) node, comprising: configuring an indication that transmissions of a mobile terminal (MT) of the IAB node can be used for crosslink interference (CLI) measurement of the DU of the IAB node; and transmitting the indication to a central unit (CU) of an IAB donor.

Aspect 11: The method of Aspect 10, wherein configuring the indication that transmissions of the MT of the IAB node can be used for CLI measurement of the DU of the IAB node comprises: configuring an indication that the DU of the IAB node and the MT of the IAB node share a same radio frequency (RF) architecture. Aspect 12: The method of Aspect 11, wherein the indication that the DU of the IAB node and the MT of the first IAB node share the same RF architecture implicitly indicates that transmissions of the MT of the IAB node can be used for CLI measurement of the DU of the IAB node.

Aspect 13: The method of any of Aspects 10-12, wherein configuring the indication that transmissions of the MT of the IAB node can be used for CLI measurement of the DU of the IAB node comprises: configuring a 1-bit indicator to explicitly indicate that transmissions of the MT of the IAB node can be used for CLI measurement of the DU of the IAB node. Aspect 14: The method of any of Aspects 10-13, wherein configuring the indication that transmissions of the MT of the IAB node can be used for CLI measurement of the DU of the IAB node comprises: configuring an indication of one or more cell identifiers associated with the DU of the IAB node for which transmissions of the MT of the IAB node can be used for CLI measurement of the DU of the IAB node. Aspect 15: The method of any of Aspects 10-14, wherein configuring the indication that transmissions of the MT of the IAB node can be used for CLI measurement of the DU of the IAB node comprises: configuring an indication of at least one of one or more beam directions supported by the MT of the IAB node or one or more frequency bands supported by the MT of the IAB node.

Aspect 16: A method of wireless communication performed by a central unit (CU) of an integrated access and backhaul (IAB) donor, comprising: receiving, from a distributed unit (DU) of a first IAB node, an indication that at least one of transmissions or measurements of a mobile terminal (MT) of the first IAB node can be used for crosslink interference (CLI) measurement of a DU of a second IAB node; and configuring at least one of the DU of the first IAB node or another node to perform one or more CLI measurements based at least in part on the indication.

Aspect 17: The method of Aspect 16, further comprising: configuring an MT of the second IAB node to transmit one or more uplink signals for CLI measurement based at least in part on the indication. Aspect 18: The method of Aspect 16 or 17, wherein the one or more CLI measurements comprise at least one of: one or more reference signal received power (RSRP) measurements, one or more received signal strength indicator (RSSI) measurements, one or more signal to noise (SNR) measurements, or one or more signal to interference plus noise (SINR) measurements.

Aspect 19: The method of any of Aspects 16-18, wherein the DU of the first IAB node is associated with the CU of the IAB donor; and wherein the DU of the second IAB node is associated with a CU of another IAB donor. Aspect 20: The method of Aspect 19, further comprising: coordinating, with the CU of the other IAB donor, one or more uplink signals to be transmitted by an MT of the second IAB node for the one or more CLI measurements based at least in part on the indication.

Aspect 21: The method of Aspect 19 or 20, further comprising: coordinating, with the CU of the other IAB donor, one or more measurement resources for one or more CLI measurements based at least in part on the indication. Aspect 22: The method of any of Aspects 19-21, further comprising: coordinating, with the CU of the other IAB donor, results of the one or more CLI measurements.

Aspect 23: An apparatus for wireless communication at a device, comprising a processor; memory coupled with the processor; and instructions stored in the memory and executable by the processor to cause the apparatus to perform the method of one or more of Aspects 1-9. Aspect 24: A device for wireless communication, comprising a memory and one or more processors coupled to the memory, the one or more processors configured to perform the method of one or more of Aspects 1-9. Aspect 25: An apparatus for wireless communication, comprising at least one means for performing the method of one or more of Aspects 1-9.

Aspect 26: A non-transitory computer-readable medium storing code for wireless communication, the code comprising instructions executable by a processor to perform the method of one or more of Aspects 1-9. Aspect 27: A non-transitory computer-readable medium storing a set of instructions for wireless communication, the set of instructions comprising one or more instructions that, when executed by one or more processors of a device, cause the device to perform the method of one or more of Aspects 1-9.

Aspect 28: An apparatus for wireless communication at a device, comprising a processor; memory coupled with the processor; and instructions stored in the memory and executable by the processor to cause the apparatus to perform the method of one or more of Aspects 10-15. Aspect 29: A device for wireless communication, comprising a memory and one or more processors coupled to the memory, the one or more processors configured to perform the method of one or more of Aspects 10-15. Aspect 30: An apparatus for wireless communication, comprising at least one means for performing the method of one or more of Aspects 10-15.

Aspect 31: A non-transitory computer-readable medium storing code for wireless communication, the code comprising instructions executable by a processor to perform the method of one or more of Aspects 10-15. Aspect 32: A non-transitory computer-readable medium storing a set of instructions for wireless communication, the set of instructions comprising one or more instructions that, when executed by one or more processors of a device, cause the device to perform the method of one or more of Aspects 10-15.

Aspect 33: An apparatus for wireless communication at a device, comprising a processor; memory coupled with the processor; and instructions stored in the memory and executable by the processor to cause the apparatus to perform the method of one or more of Aspects 16-22. Aspect 34: A device for wireless communication, comprising a memory and one or more processors coupled to the memory, the one or more processors configured to perform the method of one or more of Aspects 16-22. Aspect 35: An apparatus for wireless communication, comprising at least one means for performing the method of one or more of Aspects 16-22.

Aspect 36: A non-transitory computer-readable medium storing code for wireless communication, the code comprising instructions executable by a processor to perform the method of one or more of Aspects 16-22. Aspect 37: A non-transitory computer-readable medium storing a set of instructions for wireless communication, the set of instructions comprising one or more instructions that, when executed by one or more processors of a device, cause the device to perform the method of one or more of Aspects 16-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a distributed unit (DU) of a first integrated access and backhaul (IAB) node, comprising:
    configuring an indication of a capability to reuse measurements, associated with a mobile terminal (MT) of the first IAB node, as crosslink interference (CLI) measurements for a DU of a second IAB node; and
    transmitting the indication to a central unit (CU) of an IAB donor.

2. The method of claim 1, wherein configuring the indication of the capability comprises:
    configuring an indication that the DU of the first IAB node and the MT of the first IAB node share a same radio frequency (RF) architecture.

3. The method of claim 2, wherein the indication that the DU of the first IAB node and the MT of the first IAB node share the same RF architecture implicitly indicates the capability to reuse measurements, associated with the MT of the first IAB node, as CLI measurements for the DU of the second IAB node.

4. The method of claim 1, wherein configuring the indication of the capability comprises:
    configuring a 1-bit indicator to explicitly indicate the capability.

5. The method of claim 1, wherein configuring the indication of the capability comprises:
    configuring an indication of one or more cell identifiers associated with the DU of the first IAB for which measurements associated with the MT of the first IAB node can be reused as CLI measurements for the DU of the second IAB node.

6. The method of claim 1, wherein configuring the indication of the capability comprises:
configuring an indication of one or more beam directions supported by the MT of the first IAB node or one or more frequency bands supported by the MT of the first IAB node.

7. The method of claim 6, wherein the indication of the one or more beam directions includes an indication of one or more synchronization signal block (SSB) indices, associated with one or more cell identifiers, that correspond to one or more beam directions.

8. The method of claim 1, further comprising:
configuring another indication of a capability to reuse measurements, of an MT of the second IAB node performed by the MT of the first IAB node, as CLI measurements for the DU of the second IAB node.

9. The method of claim 8, further comprising:
transmitting the other indication to the CU of the IAB donor.

10. A method of wireless communication performed by a distributed unit (DU) of an integrated access and backhaul (IAB) node, comprising:
configuring an indication that transmissions of a mobile terminal (MT) of the IAB node can be used for crosslink interference (CLI) measurement of the DU of the IAB node; and
transmitting the indication to a central unit (CU) of an IAB donor.

11. The method of claim 10, wherein configuring the indication that transmissions of the MT of the IAB node can be used for CLI measurement of the DU of the IAB node comprises:
configuring an indication that the DU of the IAB node and the MT of the IAB node share a same radio frequency (RF) architecture.

12. The method of claim 11, wherein the indication that the DU of the IAB node and the MT of the first IAB node share the same RF architecture implicitly indicates that transmissions of the MT of the IAB node can be used for CLI measurement of the DU of the IAB node.

13. The method of claim 10, wherein configuring the indication that transmissions of the MT of the IAB node can be used for CLI measurement of the DU of the IAB node comprises:
configuring a 1-bit indicator to explicitly indicate that transmissions of the MT of the IAB node can be used for CLI measurement of the DU of the IAB node.

14. The method of claim 10, wherein configuring the indication that transmissions of the MT of the IAB node can be used for CLI measurement of the DU of the IAB node comprises:
configuring an indication of one or more cell identifiers associated with the DU of the IAB node for which transmissions of the MT of the IAB node can be used for CLI measurement of the DU of the IAB node.

15. The method of claim 10, wherein configuring the indication that transmissions of the MT of the IAB node can be used for CLI measurement of the DU of the IAB node comprises:
configuring an indication of at least one of one or more beam directions supported by the MT of the IAB node or one or more frequency bands supported by the MT of the IAB node.

16. A method of wireless communication performed by a central unit (CU) of an integrated access and backhaul (IAB) donor, comprising:
receiving, from a distributed unit (DU) of a first IAB node, an indication that at least one of transmissions or measurements of a mobile terminal (MT) of the first IAB node can be used for crosslink interference (CLI) measurement of a DU of a second IAB node; and
configuring at least one of the DU of the first IAB node or another node to perform one or more CLI measurements based at least in part on the indication.

17. The method of claim 16, further comprising:
configuring an MT of the second IAB node to transmit one or more uplink signals for CLI measurement based at least in part on the indication.

18. The method of claim 16, wherein the one or more CLI measurements comprise at least one of:
one or more reference signal received power (RSRP) measurements,
one or more received signal strength indicator (RSSI) measurements,
one or more signal to noise (SNR) measurements, or
one or more signal to interference plus noise (SINR) measurements.

19. The method of claim 16, wherein the DU of the first IAB node is associated with the CU of the IAB donor; and
wherein the DU of the second IAB node is associated with a CU of another IAB donor.

20. The method of claim 19, further comprising:
coordinating, with the CU of the other IAB donor, one or more uplink signals to be transmitted by an MT of the second IAB node for the one or more CLI measurements based at least in part on the indication.

21. The method of claim 19, further comprising:
coordinating, with the CU of the other IAB donor, one or more measurement resources for one or more CLI measurements based at least in part on the indication.

22. The method of claim 19, further comprising:
coordinating, with the CU of the other IAB donor, results of the one or more CLI measurements.

23. A distributed unit (DU) of a first integrated access and backhaul (IAB) node for wireless communication, comprising:
a memory; and
one or more processors coupled to the memory, configured to:
configure an indication of a capability to reuse measurements, associated with a mobile terminal (MT) of the first IAB node, as crosslink interference (CLI) measurements for a DU of a second IAB node; and
transmit the indication to a central unit (CU) of an IAB donor.

24. The DU of claim 23, wherein the one or more processors, to configure the indication of the capability, are configured to:
configure an indication that the DU of the first IAB node and the MT of the first IAB node share a same radio frequency (RF) architecture.

25. The DU of claim 24, wherein the indication that the DU of the first IAB node and the MT of the first IAB node share the same RF architecture implicitly indicates the capability to reuse measurements, associated with the MT of the first IAB node, as CLI measurements for the DU of the second IAB node.

26. The DU of claim 23, wherein the one or more processors, to configure the indication of the capability, are configured to:
configure a 1-bit indicator to explicitly indicate the capability.

27. The DU of claim 23, wherein the one or more processors, to configure the indication of the capability, are configured to:
configure an indication of one or more cell identifiers associated with the DU of the first IAB for which measurements associated with the MT of the first IAB node can be reused as CLI measurements for the DU of the second IAB node.

28. The DU of claim 23, wherein the one or more processors, to configure the indication of the capability, are configured to:
configure an indication of at least one of one or more beam directions supported by the MT of the first IAB node or one or more frequency bands supported by the MT of the first IAB node.

29. The DU of claim 28, wherein the indication of the one or more beam directions includes an indication of one or more synchronization signal block (SSB) indices, associated with one or more cell identifiers, that correspond to one or more beam directions.

30. The DU of claim 23, wherein the one or more processors are further configured to:
configure another indication of a capability to reuse measurements, of an MT of the second IAB node performed by the MT of the first IAB node, as CLI measurements for the DU of the second IAB node; and
transmit the other indication to the CU of the IAB donor.

* * * * *